(12) United States Patent
Iwamoto et al.

(10) Patent No.: US 12,078,987 B2
(45) Date of Patent: Sep. 3, 2024

(54) VEHICLE REMOTE INSTRUCTION SYSTEM

(71) Applicant: Toyota Jidosha Kabushiki Kaisha, Toyota (JP)

(72) Inventors: Takayuki Iwamoto, Shizuoka (JP); Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 17/009,070

(22) Filed: Sep. 1, 2020

(65) Prior Publication Data

US 2021/0080943 A1 Mar. 18, 2021

(30) Foreign Application Priority Data

Sep. 12, 2019 (JP) .................................. 2019-166260

(51) Int. Cl.
*G05D 1/00* (2006.01)
*G08G 1/01* (2006.01)
(Continued)

(52) U.S. Cl.
CPC ........... *G05D 1/0011* (2013.01); *B60W 50/14* (2013.01); *B60W 60/001* (2020.02);
(Continued)

(58) Field of Classification Search
CPC ......... G05D 1/0011; G05D 2201/0213; G05D 1/0027; G05D 1/024; G05D 1/0223;
(Continued)

(56) References Cited

U.S. PATENT DOCUMENTS 10,451,433 B1 * 10/2019 Hobbs ................ G01C 21/3676
10,866,106 B2  12/2020 Arakawa
(Continued)

FOREIGN PATENT DOCUMENTS

JP  2018-032334 A  3/2018
JP  2018-077649 A  5/2018
(Continued)

OTHER PUBLICATIONS

Machine translation for JP2019138637A, Takaishi Naoyuki, Aug. 22, 2019.*

(Continued)

*Primary Examiner* — Abdalla A Khaled
(74) *Attorney, Agent, or Firm* — Dinsmore & Shohl LLP

(57) ABSTRACT

A vehicle remote instruction system that includes a remote autonomous driving vehicle and a remote instruction apparatus in which the remote commander issues the remote instruction includes: a remote instruction request reception unit configured to receive the remote instruction request; a position information acquisition unit configured to acquire position information on a location where the remote autonomous driving vehicle transmitted the remote instruction request; a request occurring location determination unit configured to determine a location where the remote instruction request is transmitted at equal to or higher frequency than an instruction request frequency set in advance, based on the acquired remote instruction request and the position information; and a passing-detour location setting unit configured to set the location where the remote instruction request is transmitted at equal to or higher frequency than the instruction request frequency, as a passing-detour location for the remote autonomous driving vehicle.

2 Claims, 22 Drawing Sheets

(51) Int. Cl.
    *B60W 60/00*         (2020.01)
    *G01C 21/00*         (2006.01)
    *B60W 50/14*         (2020.01)
    *G01C 21/34*         (2006.01)

(52) U.S. Cl.
    CPC ..... *G01C 21/3407* (2013.01); *G01C 21/3461* (2013.01); *G01C 21/3863* (2020.08); *G08G 1/01* (2013.01)

(58) Field of Classification Search
    CPC .. G05D 1/0251; G05D 1/0255; G05D 1/0257; G05D 1/0276; G05D 1/0278; G05D 1/028; G05D 2201/0212; B60W 50/14; B60W 60/001; G01C 21/3407; G01C 21/3461; G01C 21/3863; G01C 21/3415; G08G 1/01
    See application file for complete search history.

(56) References Cited

U.S. PATENT DOCUMENTS

| | | | |
|---|---|---|---|
| 10,991,176 | B2 | 4/2021 | Yoshizaki et al. |
| 10,991,254 | B2 | 4/2021 | Hayashi et al. |
| 11,048,263 | B2 | 6/2021 | Urano |
| 11,052,780 | B2 | 7/2021 | Taguchi et al. |
| 11,215,982 | B2 | 1/2022 | Urano et al. |
| 11,281,215 | B2 | 3/2022 | Yoshizaki et al. |
| 11,325,618 | B2 | 5/2022 | Umeda |
| 2015/0187218 | A1* | 7/2015 | Harasaki ................ G01C 21/34 701/2 |
| 2015/0241878 | A1* | 8/2015 | Crombez ............. G05D 1/0246 701/23 |
| 2017/0259832 | A1* | 9/2017 | Lathrop ............. G01C 21/3697 |
| 2017/0277181 | A1* | 9/2017 | Fairfield .............. G05D 1/0027 |
| 2018/0059671 | A1* | 3/2018 | Sogen ................ G01C 21/3461 |
| 2018/0158325 | A1* | 6/2018 | Bernhardt ............ G08G 1/0129 |
| 2018/0202816 | A1* | 7/2018 | Kesting ................ G08G 1/0112 |
| 2018/0364701 | A1* | 12/2018 | Liu ...................... G05D 1/0088 |
| 2019/0072974 | A1* | 3/2019 | Hwang ................ G05D 1/0278 |
| 2019/0163176 | A1* | 5/2019 | Wang ................... G05D 1/0038 |
| 2019/0227569 | A1* | 7/2019 | Weslosky ............ G07C 5/0808 |
| 2019/0301891 | A1* | 10/2019 | Rowitch ............ G01C 21/3694 |
| 2019/0339692 | A1* | 11/2019 | Sakai .................... G05D 1/0027 |
| 2020/0033853 | A1* | 1/2020 | Araújo ................. G05D 1/0231 |
| 2020/0047773 | A1 | 2/2020 | Akaba et al. |
| 2020/0073376 | A1* | 3/2020 | Yang ..................... G05D 1/0011 |
| 2020/0239023 | A1* | 7/2020 | Srinivasan ........... G05D 1/0276 |
| 2020/0272949 | A1* | 8/2020 | Chen ............. G06Q 10/063112 |
| 2020/0356100 | A1* | 11/2020 | Nagarajan .......... G01C 21/3602 |
| 2020/0409368 | A1* | 12/2020 | Caldwell ............. G05D 1/0027 |
| 2022/0063660 | A1* | 3/2022 | Poulet .................... G06V 20/58 |

FOREIGN PATENT DOCUMENTS

| | | |
|---|---|---|
| JP | 2018-169971 A | 11/2018 |
| JP | 2019-138637 A | 8/2019 |
| WO | 2018/087828 A1 | 5/2018 |

OTHER PUBLICATIONS

Machine translation for JP2018032334A, Sogen Kiyohiro, Mar. 1, 2018.*

* cited by examiner

VEHICLE REMOTE INSTRUCTION SYSTEM

CROSS-REFERENCE TO RELATED APPLICATION

This application claims the benefit of priority from Japanese Patent Application No. 2019-166260, filed on Sep. 12, 2019, the entire contents of which are incorporated herein by reference.

TECHNICAL FIELD

The present disclosure relates to a vehicle remote instruction system that issues a remote instruction from a remote instruction apparatus to a remote autonomous driving vehicle.

BACKGROUND

For example, Japanese Unexamined Patent Application Publication No. 2018-77649 discloses a vehicle remote instruction system that includes a remote autonomous driving vehicle that performs an autonomous driving for autonomously traveling along a travel path set in advance and a remote driving for traveling based on a remote instruction from a remote commander, and a remote instruction apparatus in which a remote commander issues the remote instruction based on a remote instruction request from the remote autonomous driving vehicle.

SUMMARY

In the vehicle remote instruction system described above, if the remote instruction request frequently occurs, the load on the remote commander increases. Therefore, in the present technical field, it is desired to provide a vehicle remote instruction system capable of suppressing a remote autonomous driving vehicle from passing through a location where a remote instruction request occurs in order to reduce a load on a remote commander.

According to an aspect of the present disclosure, a vehicle remote instruction system includes a remote autonomous driving vehicle that performs an autonomous driving to travel autonomously along a travel path set based on map information and a remote driving to travel based on a remote instruction from a remote commander, and a remote instruction apparatus in which the remote commander issues the remote instruction based on a remote instruction request from the remote autonomous driving vehicle. The system is configured to include: a remote instruction request reception unit configured to receive the remote instruction request; a position information acquisition unit configured to acquire position information on a location where the remote autonomous driving vehicle transmitted the remote instruction request; a request occurring location determination unit configured to determine a location where the remote instruction request is transmitted at equal to or higher frequency than an instruction request frequency set in advance, based on the remote instruction request received by the remote instruction request reception unit and the position information acquired by the position information acquisition unit; and a passing-detour location setting unit configured to set the location where the remote instruction request is transmitted at equal to or higher frequency than the instruction request frequency, as a passing-detour location for the remote autonomous driving vehicle.

The vehicle remote instruction system can set the location where a frequency of the remote instruction request is equal to or higher than the instruction request frequency as the passing-detour location for the remote autonomous driving vehicle. As described above, by setting the passing-detour location, the vehicle remote instruction system can suppress the remote autonomous driving vehicle from passing through the location where the remote instruction request occurs. As a result, the vehicle remote instruction system can reduce the load on the remote commander.

The vehicle remote instruction system may be configured to further include: a path generation unit configured to generate a travel path avoiding the passing-detour location as the travel path for the remote autonomous driving vehicle, based on the passing-detour location set by the passing-detour location setting unit and the map information. In this way, the vehicle remote instruction system can cause the remote autonomous driving vehicle to travel by the autonomous driving while avoiding the passing-detour location where the frequency of remote instruction requests is high. As described above, the vehicle remote instruction system can cause the remote autonomous driving vehicle to travel by the autonomous driving while suppressing the remote instruction from the remote commander.

The vehicle remote instruction system may be configured to further include: a remote instruction reason collection unit configured to collect a reason why the remote instruction request is transmitted; and a notification unit configured to notify an occupant of the remote autonomous driving vehicle of the reason why the remote instruction request is transmitted from the location set as the passing-detour location, based on the reason collected by the remote instruction reason collection unit. In this case, the occupant of the remote autonomous driving vehicle can recognize the reason why the remote instruction request was transmitted from the passing-detour location, that is, the reason why the passing-detour location is set.

In the vehicle remote instruction system, the passing-detour location setting unit may be configured to cancel the setting of the passing-detour location, if a situation becomes such that the remote autonomous driving vehicle can pass through the passing-detour location by the autonomous driving. In this case, the vehicle remote instruction system can appropriately cancel the setting of the passing-detour location.

According to the present disclosure, it is possible to suppress the remote autonomous driving vehicle from passing through a location where the remote instruction request occurs, and to reduce the load on the remote commander.

DETAILED DESCRIPTION

Hereinafter, embodiments of the present disclosure will be described with reference to the drawings. In the following description, the same reference symbols will be given to the same or corresponding elements and the descriptions thereof will not be repeated.

First Embodiment

Figure 1:
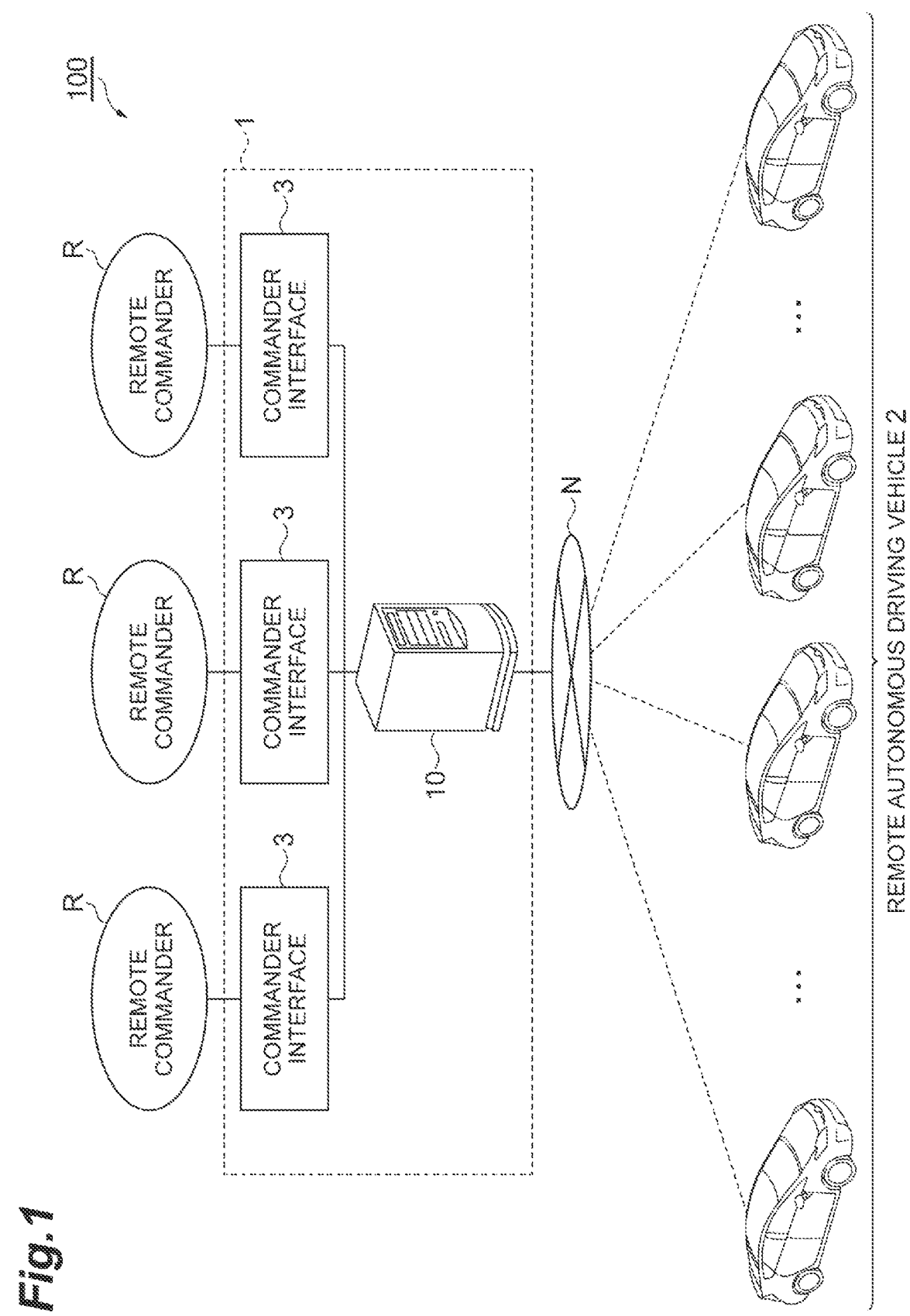
FIG. 1 is a diagram illustrating an overall image of a vehicle remote instruction system according to a first embodiment.

First, a first embodiment of a vehicle remote instruction system will be described. FIG. 1 is a diagram illustrating an overall image of a vehicle remote instruction system according to a first embodiment. A vehicle remote instruction system 100 illustrated in FIG. 1 is a system in which a remote commander R issues a remote instruction for a remote autonomous driving vehicle 2. The remote instruction is an instruction from the remote commander R relating to a determination of travel of the remote autonomous driving vehicle 2.

The remote instruction includes at least one of an instruction to start a right turn at an intersection, an instruction to start entering an intersection with a traffic signal, an instruction to start entering an intersection with poor visibility, an instruction to start a lane change, an instruction to start an offset avoidance for an obstacle ahead, an instruction to perform an emergency evacuation. In a case of a country or a region of a vehicle's right-side traffic, an instruction to start the right turn at intersection can be replaced by an instruction to start a left turn at the intersection. The intersection with poor visibility is an intersection where it is difficult to visually recognize the situation of an intersecting road due to a wall or the like when entering the intersection. The intersection with poor visibility is registered in advance in, for example, map information. Whether an intersection is the intersection with poor visibility or not may be determined according to the entering direction of the remote autonomous driving vehicle 2 to the intersection.

The offset avoidance for the obstacle ahead is a travel of causing the remote autonomous driving vehicle 2 to temporarily protrude to an adjacent lane or an oncoming lane in order to avoid a stopped vehicle, for example, when the stopped vehicle stopped near the road edge is present in front of the remote autonomous driving vehicle 2. The stopped vehicle in this case is not limited to a four-wheeled vehicle, and may be a two-wheeled vehicle. The obstacle ahead may be a bicycle, a personal mobility, a pedestrian, or the like, or may be a moving object. The emergency evacuation is a control for autonomously evacuating the remote autonomous driving vehicle 2 to an evacuation space such as a road shoulder. The evacuation space is set on a map in advance, for example. The remote commander R selects the remote instruction to perform the emergency evacuation, for example, when recognizing an abnormality of the remote autonomous driving vehicle 2 or recognizing an abnormality of occupants.

In addition, the remote instruction may include an instruction to cause the remote autonomous driving vehicle 2 in a parked situation to start. The remote instruction may include an instruction to cause the remote autonomous driving vehicle 2 in a stopped situation to start when a pedestrian or the like is detected around the remote autonomous driving vehicle 2. The remote instruction may include an instruction to cause the occupants to get on and off the remote autonomous driving vehicle 2 (for example, an instruction to automatically open and close a door and an instruction to start a voice guidance for getting off).

Configuration of Vehicle Remote Instruction System

As illustrated in FIG. 1, the vehicle remote instruction system 100 includes a remote instruction apparatus 1 to which a remote commander R inputs a remote instruction. The remote instruction apparatus 1 is communicably connected to a plurality of remote autonomous driving vehicles 2 via a network. The network N is a wireless communication network. Various kinds of information are sent to the remote instruction apparatus 1 from the remote autonomous driving vehicle 2.

In the vehicle remote instruction system 100, for example, in response to a remote instruction request from the remote autonomous driving vehicle 2, the remote commander R is requested to input the remote instruction. The remote commander R inputs the remote instruction to a commander interface 3 of the remote instruction apparatus 1. The remote instruction apparatus 1 transmits the remote instruction to the remote autonomous driving vehicle 2 through the network N. The remote autonomous driving vehicle 2 travels autonomously according to the remote instruction.

In the vehicle remote instruction system 100, the number of remote commanders R may be one, or two or more. The number of remote autonomous driving vehicles 2 that can communicate with the vehicle remote instruction system 100 is not particularly limited. A plurality of remote commanders R may alternately issue the remote instruction for one remote autonomous driving vehicle 2, or one remote commander R may issue the remote instruction for equal to or more than two remote autonomous driving vehicles 2.

Configuration of Remote Autonomous Driving Vehicle

Figure 2:
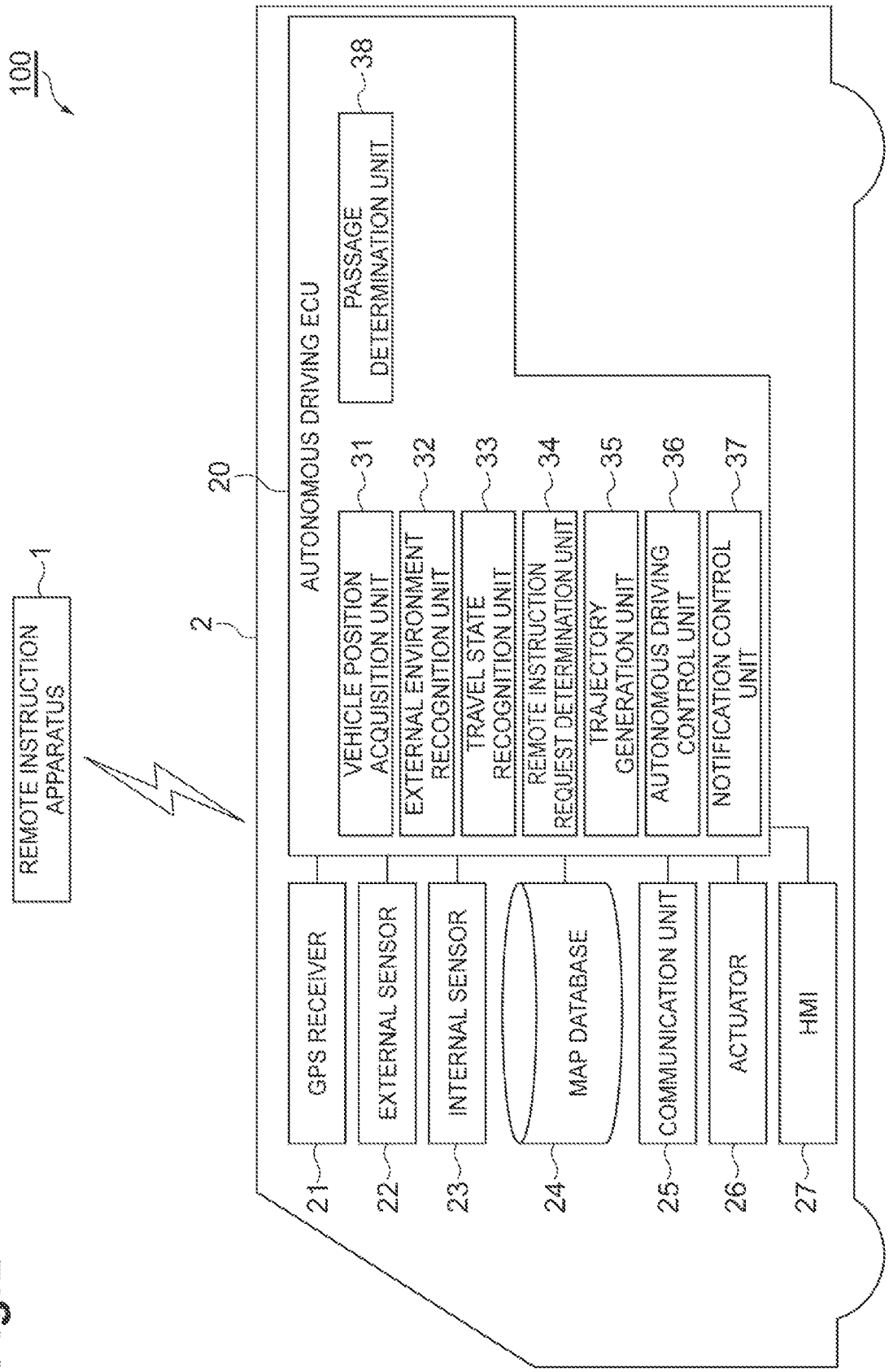
FIG. 2 is a block diagram illustrating an example of a configuration of a remote autonomous driving vehicle.

First, an example of a configuration of the remote autonomous driving vehicle 2 will be described. FIG. 2 is a block diagram illustrating an example of the configuration of the remote autonomous driving vehicle 2. The remote autonomous driving vehicle 2 illustrated in FIG. 2 performs the autonomous driving that autonomously travels along a target route (travel path) set based on the map information, and the remote driving that travels based on the remote instruction from the remote commander R.

The remote autonomous driving vehicle 2 may be used for, for example, an occupant transportation service that carries the occupants to a destination. The remote autonomous driving vehicle 2 may be, for example, an autonomous driving bus. In addition, for example, the remote autonomous driving vehicle 2 may be used for a delivery service that delivers packages to a delivery destination. In addition, in the present embodiment, as an example, the driving of the remote autonomous driving vehicle 2 is managed by the remote instruction apparatus 1. Here, the remote autonomous driving vehicle 2 autonomously travels to the destination according to the target route instructed from the remote instruction apparatus 1. The target route instruction from the remote instruction apparatus 1 may include information on the lane in which the remote autonomous driving vehicle 2 travels.

As an example, the remote autonomous driving vehicle 2 includes an autonomous driving ECU 20. The autonomous driving ECU 20 is an electronic control unit including a central processing unit (CPU), a read only memory (ROM), a random access memory (RAM), and the like. In the autonomous driving ECU 20, for example, a program recorded in the ROM is loaded into the RAM, and various functions are realized by executing the program loaded into the RAM by the CPU. The autonomous driving ECU 20 may be configured with a plurality of electronic units.

The autonomous driving ECU 20 is connected to a global positioning system (GPS) receiver 21, an external sensor 22, an internal sensor 23, a map database 24, a communication unit 25, an actuator 26, and a human machine interface (HMI) 27.

The GPS receiver 21 measures a position of the remote autonomous driving vehicle 2 (for example, latitude and longitude of the remote autonomous driving vehicle 2) by receiving signals from equal to or more than three GPS satellites. The GPS receiver 21 transmits the position information on the remote autonomous driving vehicle 2 to the autonomous driving ECU 20.

The external sensor 22 is a vehicle-mounted sensor that detects an external environment of the remote autonomous driving vehicle 2. The external sensor 22 transmits the detected detection information to the autonomous driving ECU 20. The external sensor 22 includes a plurality of sensors that detect the external environment. Specifically, the external sensor 22 includes at least a camera as the sensor. The camera is an imaging device that captures an image of the external environment of the remote autonomous driving vehicle 2. The camera is provided on the inside of a windshield of the remote autonomous driving vehicle 2 and images the front direction of the vehicle. The camera transmits the captured image relating to the external environment of the remote autonomous driving vehicle 2 to the autonomous driving ECU 20. The camera may be a monocular camera or may be a stereo camera. In addition, a plurality of cameras may be provided, and may image all or a part of the surroundings such as the left and right side directions and the rear side direction, in addition to the front direction of the remote autonomous driving vehicle 2.

The external sensor 22 may include a radar sensor as a sensor. The radar sensor is a detection device that detects an object around the remote autonomous driving vehicle 2 using radio waves (for example, millimeter waves) or light. The radar sensor includes, for example, a radar (a millimeter wave radar) or a light detection and ranging (LIDAR) as a sensor. The radar sensor transmits the radio wave or light to the surroundings of the remote autonomous driving vehicle 2, and detects the objects by receiving the radio waves or the light reflected from the objects. The radar sensor transmits the detected object information to the autonomous driving ECU 20. The objects include fixed objects such as guardrails and buildings, and moving objects such as pedestrians, bicycles, other vehicles, and the like. A plurality of radar sensors are provided, and all or at least a part of the surroundings of the remote autonomous driving vehicle 2 is to be detected. In addition, the external sensor 22 may include a sonar sensor that emits a sound wave around the remote autonomous driving vehicle 2 and detects a sound wave reflected from the obstacle or the like.

The internal sensor 23 is a vehicle-mounted sensor that detects a travel state of the remote autonomous driving vehicle 2. The internal sensor 23 includes a vehicle speed sensor, an acceleration sensor, and a yaw rate sensor. The vehicle speed sensor is a measurement device that measures a speed of the remote autonomous driving vehicle 2. As a vehicle speed sensor, for example, a vehicle wheel speed sensor is used, which is provided on vehicle wheels of the remote autonomous driving vehicle 2 or on a drive shaft rotating integrally with vehicle wheels, and measures a rotational speed of the vehicle wheels. The vehicle speed sensor transmits the measured vehicle speed information (vehicle wheel speed information) to the autonomous driving ECU 20.

The acceleration sensor is a measurement device that measures an acceleration of the remote autonomous driving vehicle 2. The acceleration sensor includes, for example, a longitudinal acceleration sensor that measures acceleration in the longitudinal direction of the remote autonomous driving vehicle 2 and the acceleration sensor may include a lateral acceleration sensor that measures a lateral acceleration of the remote autonomous driving vehicle 2. The acceleration sensor transmits, for example, acceleration information on the remote autonomous driving vehicle 2 to the autonomous driving ECU 20. The yaw rate sensor is a measurement device that measures a yaw rate (rotation angular velocity) around the vertical axis at the center of gravity of the remote autonomous driving vehicle 2. As the yaw rate sensor, for example, a Gyro sensor can be used. The yaw rate sensor transmits the measured yaw rate information on the remote autonomous driving vehicle 2 to the autonomous driving ECU 20.

The map database 24 is a database that records map information. The map database 24 is formed, for example, in a recording device such as a hard disk drive (HDD) mounted on the remote autonomous driving vehicle 2. The map information includes information on the position of the road, information on the shape of the road (for example, curvature information) and information on the position of the intersection and the branch. The map information may include traffic regulation information such as a legal speed associated with the position information. The map information may include target object information used for acquiring the position information on the remote autonomous driving vehicle 2. As the target object, road signs, road markings, traffic signals, utility poles, and the like can be used. The map database 24 may be configured as a server that can communicate with the remote autonomous driving vehicle 2.

The communication unit 25 is a communication device that controls the wireless communication with the outside of the remote autonomous driving vehicle 2. The communication unit 25 transmits and receives various information to and from the remote instruction apparatus 1 (the remote instruction server 10) via the network N.

The actuator 26 is a device used for controlling the remote autonomous driving vehicle 2. The actuator 26 includes at least a drive actuator, a brake actuator and a steering actuator. The drive actuator controls a driving force of the remote autonomous driving vehicle 2 by controlling an amount of air (throttle opening degree) supplied to the engine according to a control signal from the autonomous driving ECU 20. If the remote autonomous driving vehicle 2 is a hybrid vehicle, in addition to the amount of air supplied to the engine, the control signal from the autonomous driving ECU 20 is input to a motor as a power source, and then, the driving force is controlled. If the remote autonomous driving vehicle 2 is an electric vehicle, the control signal from the autonomous driving ECU 20 is input to a motor as a power source, and then, the driving force is controlled. The motor as the power source in these cases configures the actuator 26.

The brake actuator controls a brake system according to a control signal from the autonomous driving ECU 20 and controls a braking force applied to the vehicle wheels of the remote autonomous driving vehicle 2. For example, a hydraulic brake system can be used as the brake system. The steering actuator controls the driving of an assist motor controlling a steering torque of an electric power steering system according to a control signal from the autonomous driving ECU 20. In this way, the steering actuator controls the steering torque of the remote autonomous driving vehicle 2.

The HMI 27 is an interface for inputting and outputting information to and from the remote autonomous driving vehicle 2 and the occupant. The HMI 27 includes, for example, a display, a speaker, and the like. The HMI 27 outputs an image on a display and output a voice from a speaker according to a control signal from the autonomous driving ECU 20.

Next, an example of a functional configuration of the autonomous driving ECU 20 will be described. The autonomous driving ECU 20 includes a vehicle position acquisition unit 31, an external environment recognition unit 32, a travel state recognition unit 33, a remote instruction request determination unit (remote instruction request unit) 34, a trajectory generation unit 35, an autonomous driving control unit 36, a notification control unit 37, and a passage determination unit 38.

The vehicle position acquisition unit 31 acquires position information on the remote autonomous driving vehicle 2 on the map based on the position information from the GPS receiver 21 and the map information on the map database 24. In addition, the vehicle position acquisition unit 31 may acquire the position information on the remote autonomous driving vehicle 2 using the target object information included in the map information on the map database 24 and the result of detection performed by the external sensor 22 using the simultaneous localization and mapping (SLAM) technology. The vehicle position acquisition unit 31 may recognize a lateral position of the remote autonomous driving vehicle 2 relative to a lane (the position of the remote autonomous driving vehicle 2 in the lane width direction) from a position relationship between lane marking lines and the remote autonomous driving vehicle 2, and then, may include the lateral position in the position information. The vehicle position acquisition unit 31 may acquire the position information on the remote autonomous driving vehicle 2 using another known method.

The vehicle position acquisition unit 31 can transmit the acquired position information on the remote autonomous driving vehicle 2 to the remote instruction server 10 via the communication unit 25.

The external environment recognition unit 32 recognizes the external environment of the remote autonomous driving vehicle 2 based on the result of detection performed by the external sensor 22. The external environment includes a relative position of surrounding objects relative to the remote autonomous driving vehicle 2. The external environment may include the relative speed and moving direction of the surrounding objects relative to the remote autonomous driving vehicle 2. The external environment may include types of the objects such as other vehicles, pedestrians, and bicycles. The types of the object can be identified by a known method such as pattern matching. The external environment may include a result of recognition of the marking lines (lane line recognition) around the remote autonomous driving vehicle 2. The external environment may include a result of recognition of a lighting state of a traffic signal. The external environment recognition unit 32 can recognize the lighting state of the traffic signal (the lighting state in which the vehicle can pass or the lighting state in which the vehicle is not allowed to pass) in the front direction of the remote autonomous driving vehicle 2 based on, for example, the image from the camera of the external sensor 22.

The travel state recognition unit 33 recognizes the travel state of the remote autonomous driving vehicle 2 based on the result of detection performed by the internal sensor 23. The travel state includes the vehicle speed of remote autonomous driving vehicle 2, the acceleration of the remote autonomous driving vehicle 2, and the yaw rate of the remote autonomous driving vehicle 2. Specifically, the travel state recognition unit 33 recognizes the vehicle speed of the remote autonomous driving vehicle 2 based on the vehicle speed information from the vehicle speed sensor. The travel state recognition unit 33 recognizes the acceleration of the remote autonomous driving vehicle 2 based on the vehicle speed information from the acceleration sensor. The travel state recognition unit 33 recognizes the orientation of the remote autonomous driving vehicle 2 based on the yaw rate information from the yaw rate sensor.

The remote instruction request determination unit 34 determines whether a remote instruction request to the remote commander R (the remote instruction apparatus 1) from the remote autonomous driving vehicle 2 is required or not. The remote instruction request determination unit 34 determines whether the remote instruction request is required or not based on at least one of the position information on the remote autonomous driving vehicle 2 acquired by the vehicle position acquisition unit 31 and the map information on the map database 24, the external environment recognized by the external environment recognition unit 32, and the trajectory generated by the trajectory generation unit 35 described later.

When the remote autonomous driving vehicle 2 is in a remote instruction required situation, the remote instruction request determination unit 34 determines that the remote instruction request is required. The remote instruction required situation is a situation set in advance as a situation in which the remote instruction request to the remote instruction apparatus 1 from the remote autonomous driving vehicle 2 is required.

The remote instruction required situation may include, for example, at least one of a situation in which the remote autonomous driving vehicle 2 is turning right or left at the intersection, a situation of entering the intersection with or without a traffic signal, a situation of passing through the traffic signal (a situation of passing through the traffic signal corresponding to a pedestrian crossing), a situation of starting a lane change, a situation of entering a construction site, a situation of entering a railroad crossing, a situation of stopping at a bus stop of an autonomous driving bus, a situation in which an allocated autonomous driving vehicle stops at a boarding location or a destination, a situation in which a situation in which determination of the offset avoidance for the obstacle ahead is required, a situation in which a determination of overtaking the preceding vehicle is required. The remote instruction required situation may include other situations in which a determination of the emergency evacuation is required. In a case of a country or a region of a vehicle's right-side traffic, a situation of turning right at the intersection may be replaced by a situation of turning left at the intersection.

For example, if the remote autonomous driving vehicle 2 is in a situation of entering the intersection of turning right at the intersection, the remote instruction request determination unit 34 determines that the remote instruction request is required. If the remote autonomous driving vehicle 2 is in a situation of starting the lane change in order to reach the destination, the remote instruction request determination unit 34 determines that the remote instruction request is required. If an obstacle for which the offset avoidance is required is present in the front direction of the remote autonomous driving vehicle 2, the remote instruction request determination unit 34 may determine that the remote instruction request is required.

The remote instruction request determination unit 34 can recognize that the remote autonomous driving vehicle 2 is in the situation of turning right at the intersection, the remote autonomous driving vehicle 2 is in the situation of approaching the intersection with a traffic signal, or the remote autonomous driving vehicle 2 is in the situation of starting the lane change, from the position information, the map information, and the target route of the remote autonomous driving vehicle 2, for example.

If it is determined that the remote instruction request is required, the remote instruction request determination unit 34 requests the remote instruction server 10 for the remote instruction by the remote commander R. Here, the remote instruction request determination unit 34 transmits a remote instruction request to the remote instruction server 10 as a remote instruction request. The remote instruction request includes, for example, the position information on the remote autonomous driving vehicle 2. The position information acquired by the vehicle position acquisition unit 31 can be used as this position information. The remote instruction request includes, for example, identification information on the remote autonomous driving vehicle 2. The remote instruction request determination unit 34 may request for the remote instruction with a margin time in advance. When a distance between the intersection or the like subject to the remote instruction and the remote autonomous driving vehicle 2 is equal to or shorter than a certain distance, the remote instruction request determination unit 34 may determine that the remote instruction request is required. The remote instruction request determination unit 34 may use a remaining time for arrival instead of the distance.

In addition, the remote instruction request may include, for example, a reason why the remote instruction request is transmitted to the remote instruction server 10. The reason includes, for example, information for specifying a remote instruction required situation that is determined require the remote instruction request. Specifically, the reason includes information for specifying the situation in which the determination of the offset avoidance for the obstacle ahead is required, a situation in which the determination of overtaking the preceding vehicle is required, and the like.

In addition, if it is determined that the remote instruction request is required, the remote instruction request determination unit 34 transmits the travel situation information on the remote autonomous driving vehicle 2 to the remote instruction server 10. The travel situation information on the remote autonomous driving vehicle 2 includes information for the remote commander R to recognize the situation of the remote autonomous driving vehicle 2.

Specifically, the travel situation information on the remote autonomous driving vehicle 2 includes the detection information by the vehicle-mounted sensor of the remote autonomous driving vehicle 2 and/or the information (for example, an overhead view image of the remote autonomous driving vehicle 2) generated from detection information by the vehicle-mounted sensor. For example, the detection information by the vehicle-mounted sensor may include a camera image of the front direction of the remote autonomous driving vehicle 2 captured by the camera of the remote autonomous driving vehicle 2. The detection information by the vehicle-mounted sensor may include a camera image of surroundings of the remote autonomous driving vehicle 2 including the side and rear direction of the remote autonomous driving vehicle 2. In addition, the detection information by the vehicle-mounted sensor may include object information detected by the radar sensor of the external sensor 22. The detection information by the vehicle-mounted sensor may include the result of identification of the type of the object. The remote instruction request determination unit 34 may use the information on the external environment of the remote autonomous driving vehicle 2 recognized by the external environment recognition unit 32 as the detection information by the vehicle-mounted sensor.

In addition, the detection information by the vehicle-mounted sensor may include information on the vehicle speed of the remote autonomous driving vehicle 2 detected by the vehicle speed sensor of the internal sensor 23. The detection information by the vehicle-mounted sensor may include information on the yaw rate of the remote autonomous driving vehicle 2 detected by the yaw rate sensor of the internal sensor 23. The detection information by the vehicle-mounted sensor may include information on the steering angle of the remote autonomous driving vehicle 2. The remote instruction request determination unit 34 may use the travel state information on the remote autonomous driving vehicle 2 recognized by the travel state recognition unit 33 as the detection information by the vehicle-mounted sensor.

Furthermore, the travel situation information on the remote autonomous driving vehicle 2 may include the position information on the remote autonomous driving vehicle 2. The travel situation information on the remote autonomous driving vehicle 2 may include information on the occupants (presence or absence of the occupants or the number of occupants). The travel situation information on the remote autonomous driving vehicle 2 may include information on the trajectory according to the selectable remote instruction by the remote commander R. The trajectory will be described later.

The trajectory generation unit 35 generates a trajectory used for the autonomous driving of the remote autonomous driving vehicle 2. The trajectory generation unit 35 generates the trajectory for the autonomous driving based on the target route set in advance, the map information, the position information on the remote autonomous driving vehicle 2, the external environment of the remote autonomous driving vehicle 2, and the travel state of the remote autonomous driving vehicle 2. The trajectory corresponds to a travel plan of the autonomous driving.

The target route is generated in the remote instruction server 10 as described later. The trajectory generation unit 35 receives the target route from the remote instruction server 10 via the communication unit 25, and generates the trajectory using the received target route.

The trajectory includes a path where the vehicle travels by the autonomous driving and a vehicle speed plan in the autonomous driving. The path is a locus that the vehicle in the autonomous driving will travel on the target route. For example, data (steering angle profile) on the change of the steering angle of the remote autonomous driving vehicle 2 according to the position on the target route can be the path. The position on the target route is, for example, a set longitudinal position set in each predetermined interval (for example, 1 m) in the traveling direction of the target route. The steering angle profile is data in which a target steering angle is associated with each set longitudinal position.

The trajectory generation unit 35 generates the path on which the remote autonomous driving vehicle 2 will travel, based on, for example, the target route, the map information, the external environment of the remote autonomous driving vehicle 2, and the travel state of the remote autonomous driving vehicle 2. The trajectory generation unit 35 generates the path such that, for example, the remote autonomous driving vehicle 2 passes through the center of the lane included in the target route (the center in the lane width direction).

The vehicle speed plan is data in which a target vehicle speed is associated with each set longitudinal position, for example. The set longitudinal position may be set based on the traveling time of the remote autonomous driving vehicle 2 instead of the distance. The set longitudinal position may be set as an arrival position of the vehicle after 1 second or an arrival position of the vehicle after 2 seconds. In this case, the vehicle speed plan can also be expressed as data according to the travel time.

The trajectory generation unit 35 generates the vehicle speed plan based on traffic regulation information such as a legal speed included in the path and map information, for example. Instead of the legal speed, a legal speed set in advance for the position or the section on the map may be used. If the remote autonomous driving vehicle 2 is an autonomous driving bus, the trajectory generation unit 35 may generate the vehicle speed plan while taking a stopping time at the bus stop into account, based on a driving plan including an arrival time set for each bus stop. The trajectory generation unit 35 generates an autonomous driving trajectory from the path and the vehicle speed plan. The method of generating the trajectory by the trajectory generation unit 35 is not limited to the above-described content, and a well-known method regarding the autonomous driving can be adopted. The same applies to the contents of trajectory.

If the remote instruction is requested to the remote instruction server 10 by the remote instruction request determination unit 34, or if the remote autonomous driving vehicle 2 approaches the intersection or the like which is the target of the remote instruction, the trajectory generation unit 35 generates the trajectory corresponding to the remote instruction in advance. The content of the remote instruction is determined in advance according to the situation of the remote autonomous driving vehicle 2. For example, the content of the remote instruction at the time of turning right at the intersection includes a remote instruction to progress (start to turn right) and a remote instruction to stop (determination pending). The content of the remote instruction at the time of turning right at the intersection may include a remote instruction to go straight without performing the right turn (remote instruction to change the route), or may include the remote instruction to perform the emergency evacuation.

The trajectory generation unit 35 generates a trajectory for the remote autonomous driving vehicle 2 to turn right at the intersection such that, for example, the remote autonomous driving vehicle 2 responses to the remote instruction to start the right turn in a situation of turning right at the intersection. The trajectory generation unit 35 may update the trajectory according to the change in the external environment until the remote instruction is received. In addition, if the remote instruction to switch to go straight at the intersection from the right turn at the intersection is present, the trajectory generation unit 35 may generate the trajectory to go straight through the intersection.

If the remote instruction for the emergency evacuation is present, the trajectory generation unit 35 may generate the trajectory for the emergency evacuation in advance. The emergency evacuation trajectory is generated such that the remote autonomous driving vehicle 2 stops at any of the evacuation spaces set on the map in advance. The trajectory generation unit 35 may recognize the presence or absence of an obstacle at each evacuation space based on the external environment, for example, and may generate the trajectory for the emergency evacuation to stop at an empty evacuation space. The trajectory generation unit 35 does not necessarily need to generate the trajectory in advance, and may generate the trajectory in response to the remote instruction after receiving the remote instruction.

The autonomous driving control unit 36 performs the autonomous driving of the remote autonomous driving vehicle 2. The autonomous driving control unit 36 performs the autonomous driving of the remote autonomous driving vehicle 2 based on, for example, the external environment of the remote autonomous driving vehicle 2, the travel state of the remote autonomous driving vehicle 2, and the trajectory generated by the trajectory generation unit 35. The autonomous driving control unit 36 performs the autonomous driving of the remote autonomous driving vehicle 2 by transmitting a control signal to the actuator 26.

If the remote instruction is requested to the remote instruction server 10 by the remote instruction request determination unit 34, the autonomous driving control unit 36 waits for the reception of the remote instruction from the remote instruction server 10. If the remote instruction is requested after the remote autonomous driving vehicle 2 stops, the autonomous driving control unit 36 remains the stopped state until the remote instruction is received.

If the occupant having a driver's license is on board and when the remote instruction is not received even after a waiting time set in advance has elapsed, the autonomous driving control unit 36 may require a determination by the occupant or the manual driving. If the remote instruction is not received even after the waiting time has elapsed, and the determination by the occupant or the manual driving is not possible (a case where the occupant is not on board, or the like), the autonomous driving control unit 36 may perform the emergency evacuation autonomously.

When the remote instruction is received from the remote commander R, the autonomous driving control unit 36 performs the remote driving based on the remote instruction. When the remote driving ends, the autonomous driving control unit 36 performs the autonomous driving based on the trajectory generated by the trajectory generation unit 35.

The notification control unit 37 notifies the occupant of the remote autonomous driving vehicle 2 of various kinds of information by controlling the HMI 27. For example, the notification control unit 37 can display the target route instructed by the remote instruction apparatus 1 on the display of the HMI 27. As described above, the notification control unit 37 and the HMI 27 function as a notification unit that gives notification to the occupant of the remote autonomous driving vehicle 2.

The passage determination unit 38 determines whether or not the vehicle can pass through the passing-detour location when traveling by autonomous driving based on an instruction from the remote instruction server 10. If it is determined that the vehicle can pass through the passing-detour location by the autonomous driving, the passage determination unit 38 determines that it is possible to pass through the passing-detour location by the autonomous driving. Here, the case where the vehicle can pass through the passing-detour location by the autonomous driving means the case where the remote autonomous driving vehicle 2 can autonomously pass by the autonomous driving without performing the remote driving at the passing-detour location. If the vehicle can pass through the passing-detour location by the autonomous driving, the passage determination unit 38 transmits remote autonomous driving passage information indicating that the vehicle can pass through the passing-detour location by the autonomous driving, to the remote instruction server 10. The passing-detour location, the remote autonomous driving passage information, and the processing by the passage determination unit 38 will be described later in detail.

Configuration of Remote Instruction Apparatus

Hereinafter, a configuration of the remote instruction apparatus 1 according to the present embodiment will be described with reference to the drawings. As illustrated in FIG. 1, the remote instruction apparatus 1 includes a remote instruction server 10, a commander interface 3, and a map database 4 (refer to FIG. 4).

Figure 3:
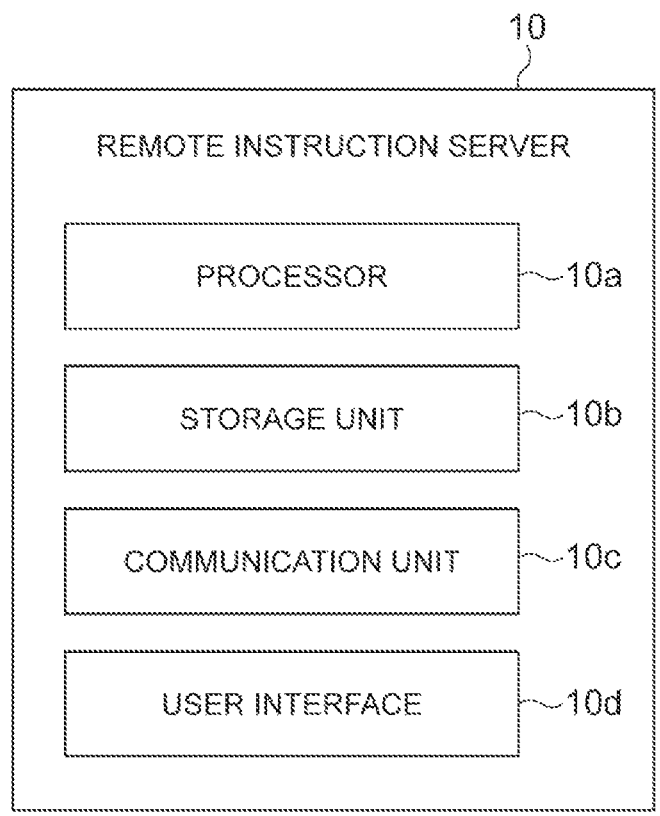
FIG. 3 is a block diagram illustrating an example of a hardware configuration of a remote instruction server.

First, a hardware configuration of the remote instruction server 10 will be described. FIG. 3 is a block diagram illustrating an example of the hardware configuration of the remote instruction server 10. As illustrated in FIG. 3, the remote instruction server 10 is configured as a general computer including a processor 10a, a storage unit 10b, a communication unit 10c, and a user interface 10d. The user in this case means a user (administrator or the like) of the remote instruction server 10.

The processor 10a controls the remote instruction server 10 by operating various operating systems. The processor 10a is an arithmetic unit such as a central processing unit (CPU) including a control device, an arithmetic device, a register, and the like. The processor 10a performs overall management of the storage unit 10b, the communication unit 10c, and the user interface 10d. The storage unit 10b is configured to include at least one of a memory and a storage. The memory is a recording medium such as a ROM and a RAM. The storage is a recording medium such as a hard disk drive (HDD).

The communication unit 10c is a communication device for performing communication via the network N. A network device, a network controller, a network card, and the like can be used as the communication unit 10c. The user interface 10d is an input output unit of the remote instruction server 10 to and from the user such as an administrator. The user interface 10d includes output devices such as a display and a speaker, and an input device such as a touch panel. The remote instruction server 10 does not necessarily need to be provided in the facility, and may be mounted on a moving body such as a vehicle.

Figure 4:
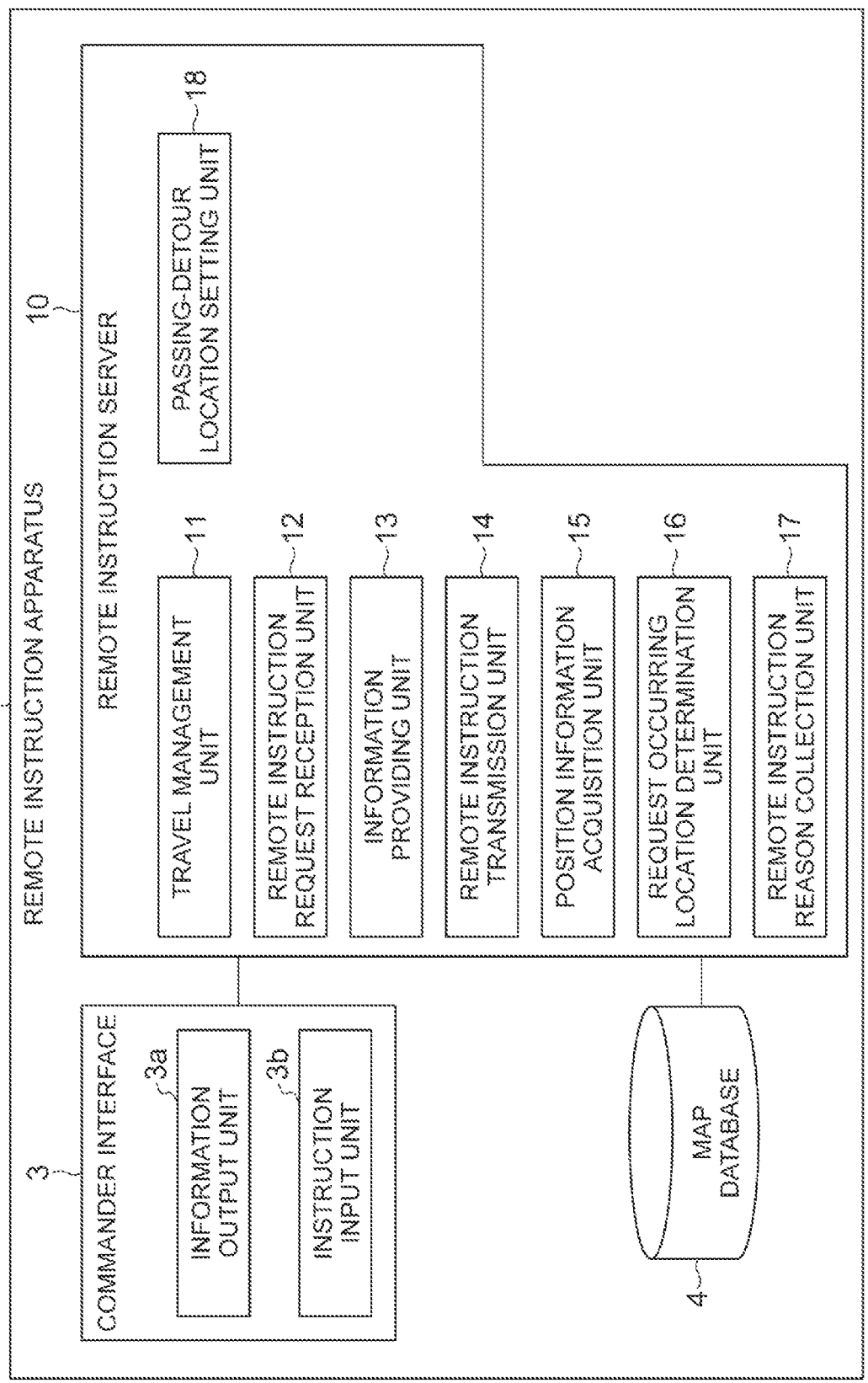
FIG. 4 is a block diagram illustrating an example of a configuration of a remote instruction apparatus.

FIG. 4 is a block diagram illustrating an example of the configuration of the remote instruction apparatus 1. As illustrated in FIG. 4, the remote instruction apparatus 1 further includes a map database 4 connected to the remote instruction server 10 in addition to the commander interface 3 and the remote instruction server 10. The map database 4 is a database that records the map information. The map database 4 is formed in a recording device such as an HDD mounted on the remote instruction apparatus 1, for example. The map information includes information on the position of the road, information on the shape of the road (for example, curvature information) and information on the position of the intersection and the branch. In addition, the map information includes the position information on the passing-detour location, which is a location where it is difficult (not possible) for the remote autonomous driving vehicle 2 to pass by the autonomous driving. At the passing-detour location, the remote autonomous driving vehicle 2 performs a remote request, and the remote autonomous driving vehicle 2 travels by the remote driving by the remote commander R. The passing-detour location is a location where the remote autonomous driving vehicle 2 can pass by the remote driving based on the remote instruction from the remote commander R. That is, the passing-detour location is a location where the remote autonomous driving vehicle 2 cannot autonomously pass by the autonomous driving performed, and is a location where the remote instruction from the remote commander R is required. The setting of the passing-detour location will be described later in detail.

The commander interface 3 is an input output unit of the remote instruction apparatus 1 to and from the remote commander R. The commander interface 3 includes an information output unit 3a and an instruction input unit 3b.

The information output unit 3a is a device that outputs information used for the remote instruction of the remote autonomous driving vehicle 2 to the remote commander R. The information output unit 3a includes a display that outputs image information and a speaker that outputs sound information.

For example, an image (an image of a scenery ahead) of the front direction of the remote autonomous driving vehicle 2 captured by the camera of the remote autonomous driving vehicle 2 is displayed on the display. The display may have a plurality of display screens, and images of the side and/or rear direction of the remote autonomous driving vehicle 2 may be displayed. The display is not particularly limited as long as the display can provide visual information to the remote commander R. The display may be a wearable device mounted to cover the eyes of the remote commander R.

The speaker is a headset speaker mounted to a head of the remote commander R, for example. For example, the speaker informs the remote commander R of the situation of the remote autonomous driving vehicle 2 (for example, the situation such as a right turn at the intersection) by the voice. The speaker does not necessarily need to be a headset, and may be a stationary type.

The information output unit 3a may provide the information to the remote commander R by vibration. The information output unit 3a may include, for example, a vibration actuator provided on a seat of the remote commander R. The information output unit 3a may alert the remote commander R about the approach of another vehicle to the remote autonomous driving vehicle 2 by the vibration. The information output unit 3a may include the vibration actuators on the left and right sides of the seat, and may vibrate the vibration actuators at the positions corresponding to the approaching direction of other vehicles. The information output unit 3a may include a wearable vibration actuator that is mounted to a body of the remote commander R. The information output unit 3a can provide the information to the remote commander R by vibrating the vibration actuator mounted at each position of the body in accordance with the approaching direction of the other vehicles.

The instruction input unit 3b is a device to which the remote instruction is input from the remote commander R. The instruction input unit 3b includes, for example, an operation lever. In the instruction input unit 3b, for example, a remote instruction for the remote autonomous driving vehicle 2 to progress is input by tilting the operation lever toward the inner side of the remote commander R in the front-rear direction, and a remote instruction to decelerate or to stop the remote autonomous driving vehicle 2 is input by tilting the operation lever toward the front side of the remote commander R in the front-rear direction.

The instruction input unit 3b may include a button, and the remote commander R may input a remote instruction by tilting the operation lever while pressing the button. The instruction input unit 3b may include a touch panel. One touch panel may be commonly used with the display of the information output unit 3a. The instruction input unit 3b may include an operation pedal.

The instruction input unit 3b may include a voice recognition function or a gesture recognition function. The gesture of the remote commander R can be recognized by a camera and/or a radar sensor mounted on the commander interface 3. In the instruction input unit 3b, the remote instruction may be input by combining two or more of the operation lever operation, the button operation, the touch panel operation, the operation pedal operation, the voice input, and gesture.

Next, a functional configuration of the remote instruction server 10 will be described. As illustrated in FIG. 4, the remote instruction server 10 includes a travel management unit (path generation unit) 11, a remote instruction request reception unit 12, an information providing unit 13, a remote instruction transmission unit 14, a position information acquisition unit 15, a request occurring location determination unit 16, a remote instruction reason collection unit 17, and a passing-detour location setting unit 18.

The travel management unit 11 generates a target route on which the remote autonomous driving vehicle 2 travels, and manages the driving of the remote autonomous driving vehicle 2 by causing remote autonomous driving vehicle 2 to travel by the autonomous driving along the target route. The travel management unit 11 generates the target route based on, for example, a request to start traveling of the remote autonomous driving vehicle 2 and issues instruction to the remote autonomous driving vehicle 2. The request to start traveling of the remote autonomous driving vehicle 2 is appropriately determined, for example, according to a service performed by the vehicle remote instruction system 100 using the remote autonomous driving vehicle 2.

When an occupant transport instruction is accepted as an instruction to start traveling, for example, the travel management unit 11 can generate a target route based on the transport instruction and issues the instruct to the remote autonomous driving vehicle 2. Alternatively, when a package delivery instruction is accepted as an instruction to start traveling, for example, the travel management unit 11 can generate a target route based on the delivery instruction and issues instruction to the remote autonomous driving vehicle 2.

The travel management unit 11 generates the target route based on, for example, the destination, the map information stored in the map database 4, and the position information on the remote autonomous driving vehicle 2. For example, the target route may be generated in consideration of a travel distance to the destination. The target route may be generated in consideration of traffic information such as a traffic congestion. The destination is set according to the service performed by the vehicle remote instruction system 100 using the remote autonomous driving vehicle 2. For example, the destination may be set by the occupant of the remote autonomous driving vehicle 2, or the location of the delivery destination of the package may be set as the destination. For example, the target route may be a route toward the destination via the occupant's boarding location. In addition, when generating the target route, the travel management unit 11 can acquire the position information on the remote autonomous driving vehicle 2 from the remote autonomous driving vehicle 2, for example. In addition, for example, if the travel management unit 11 constantly monitors the position of the remote autonomous driving vehicle 2 (that is, if the position information is constantly acquired), the travel management unit 11 may use the monitored position information on the remote autonomous driving vehicle 2.

In addition, when the passing-detour location is set in the map information stored in the map database 4, the travel management unit 11 generates a target route avoiding the passing-detour location. That is, the travel management unit 11 generates a detour target route so as not to pass through the passing-detour location. As described above, the travel management unit 11 generates the target route avoiding the passing-detour location as a target route of the remote autonomous driving vehicle 2, based on the passing-detour location and the map information.

The travel management unit 11 may set a lane in which the remote autonomous driving vehicle 2 is to travel based on the map information and the destination, and may generate the target route including the information on the lane to travel, in the target route.

The remote instruction request reception unit 12 receives a remote instruction request from the remote autonomous driving vehicle 2 when the remote autonomous driving vehicle 2 requests the remote instruction server 10 for the remote instruction. In addition, the remote instruction request reception unit 12 acquires the travel situation information on the remote autonomous driving vehicle 2 that has requested for the remote instruction, by the transmission from the remote autonomous driving vehicle 2. The remote instruction request reception unit 12 may acquire the travel situation information on the remote autonomous driving vehicle 2 which does not request for the remote instruction.

If the remote instruction request reception unit 12 receives the remote instruction request, the information providing unit 13 requests the responsible remote commander R via the commander interface 3 to input the remote instruction.

In addition, the information providing unit 13 provides the remote commander R with the information on the remote autonomous driving vehicle 2 based on the detection information by the external sensor 22 in the remote autonomous driving vehicle 2, which is acquired by the remote instruction request reception unit 12. For example, the information providing unit 13 displays an image of the front direction of the remote autonomous driving vehicle 2 on the display of the information output unit 3a of the commander interface 3. The information providing unit 13 may display an image viewed from the vicinity of the driver's seat of the remote autonomous driving vehicle 2 by viewpoint conversion. The information providing unit 13 may display the side image and rear image of the remote autonomous driving vehicle 2. The information providing unit 13 may display a panoramic image that is a composite image of the images in which the surroundings of the remote autonomous driving vehicle 2 are imaged, or may display an overhead image generated to look down the remote autonomous driving vehicle 2 by the image composition and the viewpoint conversion. The information providing unit 13 may perform highlight display of an object in the image (for example, marking that surrounds another vehicle or the like with a frame). If a traffic signal is included in the image, the information providing unit 13 may display a result of recognizing the lighting state of the traffic signal on the display.

The information providing unit 13 may display various information on the display, not limited to the camera image captured by the camera of the remote autonomous driving vehicle 2. The information providing unit 13 may display the situation of the remote autonomous driving vehicle 2 which requested for the remote instruction (the situation at the time of the right turn at the intersection, or the like) using texts or icons. The information providing unit 13 may display a type of remote instruction that can be selected by the remote commander R, on the display. The information providing unit 13 may display the information (a locus on which the remote autonomous driving vehicle 2 performs progressing corresponding to the remote instruction to perform the progressing) relating to the trajectory of the remote autonomous driving vehicle 2 in accordance with the remote instruction, on the display.

The information providing unit 13 may display the information on an object detected by the radar sensor of the remote autonomous driving vehicle 2. The information on the object may be displayed as an icon in the overhead image. When the types of the objects are identified, the icons may be displayed according to the types of the objects. The information providing unit 13 may display the map information on the surroundings of the remote autonomous driving vehicle 2 acquired based on the position information on the remote autonomous driving vehicle 2, on the display. The map information may be included in the remote instruction server 10 or may be acquired from another server or the like. The map information on the surroundings of the remote autonomous driving vehicle 2 may be acquired from the remote autonomous driving vehicle 2.

The information providing unit 13 may display information on the vehicle speed of the remote autonomous driving vehicle 2 on the display, and may display information on the steering angle of the remote autonomous driving vehicle 2 on the display. The information providing unit 13 may display information on a slope of the road where the remote autonomous driving vehicle 2 is positioned, on the display. If the remote autonomous driving vehicle 2 has a vehicle interior camera, the information providing unit 13 may display an image of the vehicle interior of the remote autonomous driving vehicle 2 as necessary.

The information providing unit 13 may provide the remote commander R with the sound information through the speaker of the information output unit 3a of the commander interface 3. In this case, the information providing unit 13 may output, for example, the approach of another vehicle or the like around the remote autonomous driving vehicle 2 from the speaker as the sound or the voice. It is not essential to provide with the information through the speaker.

If the remote commander R inputs the remote instruction to the instruction input unit 3b of the commander interface 3, the remote instruction transmission unit 14 transmits the input remote instruction to the remote autonomous driving vehicle 2. If the remote instruction input by the remote commander R is transmitted to the remote autonomous driving vehicle 2, the information providing unit 13 may continuously transmit the information on the remote autonomous driving vehicle 2 to the remote commander R, or may switch the information to information on another remote autonomous driving vehicle 2 that requests for the remote instruction.

When the remote instruction request reception unit 12 receives the remote instruction request, the position information acquisition unit 15 acquires the position information on the location from which the remote autonomous driving vehicle 2 transmitted the remote instruction request. Here, the position information acquisition unit 15 can acquire, for example, the position information on the remote autonomous driving vehicle 2 included in the remote instruction request.

The request occurring location determination unit 16 determined a location from which the remote instruction request is transmitted equal to or more frequently than an instruction request frequency set in advance, based on the remote instruction request received by the remote instruction request reception unit 12 and the position information acquired by the position information acquisition unit 15. If a deviation of the position information is within a predetermined distance (for example, within several meters), the request occurring location determination unit 16 may determine that locations are the same. In addition, the instruction request frequency here is the number of remote instruction requests within a predetermined period. For example, the predetermined period may be a period from a current time back to a predetermined time or back to a predetermined number of days in the past.

Here, the request occurring location determination unit 16 can use a predetermined counting target location as the location for counting the instruction request frequency of remote instruction requests. That is, when the remote instruction requests are performed at the counting target location, the request occurring location determination unit 16 counts the remote instruction requests. Originally, the counting target location is a location where the remote autonomous driving vehicle 2 autonomously passes by the autonomous driving without using the remote instruction. In other words, the counting target location is a location other than the location that is predetermined by the remote instruction. For example, the counting target location does not include a location (for example, an intersection, a railroad crossing, or the like.) that is determined for the vehicle to pass by the remote instruction. That is, the request occurring location determination unit 16 counts the remote instruction requests transmitted from the location which is originally a location where the remote autonomous driving vehicle 2 can autonomously pass by the autonomous driving, but is changed to a situation in which the vehicle cannot autonomously pass by the autonomous driving (the situation is temporary change).

For example, the location which is originally a location where the remote autonomous driving vehicle 2 can autonomously pass by the autonomous driving may be a location where it becomes necessary to perform offset avoidance on a vehicle that is stopped on the travel lane in front of remote autonomous driving vehicle 2, based on the remote instruction. In addition, for example, the location which is originally a location where the remote autonomous driving vehicle 2 can autonomously pass by the autonomous driving may be a location where it becomes necessary to perform offset avoidance on the construction section where the construction is being performed on the travel lane in front of remote autonomous driving vehicle 2 (a construction section), based on a remote instruction.

Here, the information on the locations (for example, intersections, railroad crossings, or the like) that are determined in advance for the vehicle to pass by the remote instruction is included in the map information stored in the map database 4. Therefore, the request occurring location determination unit 16 can determine whether the location where the remote autonomous driving vehicle 2 performed the remote instruction request is the counting target location or not based on the map information, and can count the remote instruction request.

As described above, the request occurring location determination unit 16 determines whether the location from which the remote instruction request is transmitted is the counting target location or not based on the remote instruction request received by the remote instruction request reception unit 12 and the position information acquired by the position information acquisition unit 15. If it is determined that the location from which the remote instruction request is transmitted is the counting target location, the request occurring location determination unit 16 determines a location from which the remote instruction requests are transmitted at equal to or higher frequency than the instruction request frequency, based on the remote instruction request received by the remote instruction request reception unit 12 and the position information acquired by the position information acquisition unit 15.

In addition, if a remote instruction request is made at the counting target location, the request occurring location determination unit 16 stores the location where the remote instruction request was made and a time when the remote instruction request was made at the location in association with each other. Here, if a plurality of remote instruction requests are made in a certain location, the request occurring location determination unit 16 stores each time when the remote instruction requests are made. The request occurring location determination unit 16 can determine the location from which the remote instruction requests are transmitted at equal to or higher frequency than the instruction request frequency, based on the information formed in this manner using the association.

However, If the predetermined instruction request frequency is one time, the request occurring location determination unit 16 does not necessarily need to store the location where the remote instruction request is made and the time when the remote instruction request is made at the location in association with each other. In this case, when the remote instruction request is made at the counting target location, the request occurring location determination unit 16 can determine the location from which the remote instruction request is transmitted, as the location from which the remote instruction requests are transmitted equal to or more that the instruction request frequency.

The request occurring location determination unit 16 may determine whether or not the remote instruction requests equal to or higher than the instruction request frequency are transmitted in the location where the remote instruction request transmitted, based on the remote instruction requests transmitted from a plurality of remote autonomous driving vehicles 2.

The remote instruction reason collection unit 17 collects a reason why the remote instruction request was transmitted from the remote autonomous driving vehicle 2. Here, the remote instruction reason collection unit 17 may collect the reason why the remote instruction request was transmitted only when the remote instruction request was transmitted from the counting target location. The remote instruction reason collection unit 17 may acquire the reason based on the input of the remote commander R, and if the reason why the remote instruction request is transmitted is included in the remote instruction request transmitted from the remote autonomous driving vehicle 2, then, may acquire that reason. If the reason is acquired by the remote instruction reason collection unit 17 when the remote instruction request is transmitted, the request occurring location determination unit 16 stores the acquired reason in association with the location where the remote instruction request was made.

Specifically, for example, when issuing the remote instruction in response to the remote instruction request from the remote autonomous driving vehicle 2, the remote commander R may check the remote instruction required situation based on the image displayed on the display of the information output unit 3a, and may input the reason why the remote instruction request was transmitted. For example, the remote commander R may check the image displayed on the display, may recognize that a vehicle is stopped in the travel lane in front of the remote autonomous driving vehicle 2 or that the construction is being performed in the travel lane ahead, and may input the recognized situation as the reason why the remote instruction request was transmitted. In this case, the remote instruction reason collection unit 17 can acquire the reason why the remote instruction request was transmitted, based on the input of the remote commander R.

Setting Passing-Detour Location

The passing-detour location setting unit 18 sets a location from which the remote instruction request is transmitted at equal to or higher frequency than the instruction request frequency as a passing-detour location for the remote autonomous driving vehicle 2 based on the result of determination performed by the request occurring location determination unit 16. As described above, the passing-detour location is a location where the remote autonomous driving vehicle 2 cannot autonomously pass by the autonomous driving and where the remote instruction from the remote commander R is required. As described above, the passing-detour location setting unit 18 sets the location where originally the remote autonomous driving vehicle 2 can autonomously pass by the autonomous driving, but the remote instruction request was made at equal to or higher frequency than the instruction request frequency without being able to pass by the autonomous driving, as the passing-detour location. The passing-detour location setting unit 18 sets the position of the set passing-detour location on the map in the map information stored in the map database 4.

Figure 5:
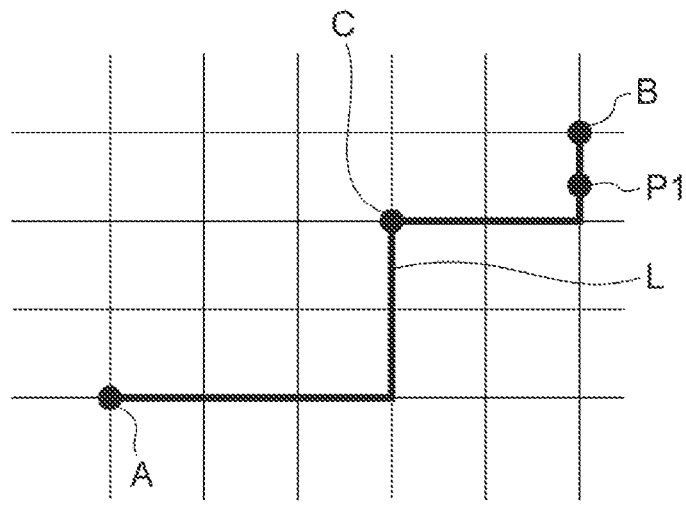
FIG. 5 is a diagram illustrating an example of setting a target route.
Figure 6:
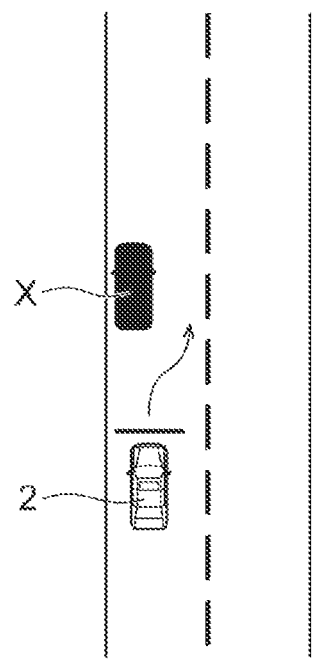
FIG. 6 is a diagram illustrating an example of a situation in which a remote instruction request is performed.

As a specific example, as illustrated in FIG. 5 for example, a target route L from a location A to a location B is set by the travel management unit 11, and the remote autonomous driving vehicle 2 travels along the target route L. At a location P1 before the location B, a stopped vehicle X is present in the travel lane of the remote autonomous driving vehicle 2 as illustrated in FIG. 6. In this case, the remote instruction request determination unit 34 of the remote autonomous driving vehicle 2 determines that the situation is a situation in which the determination of offset avoidance for the stopped vehicle X ahead is required (remote instruction required situation).

Specifically, here, the remote instruction request determination unit 34 determines that the remote autonomous driving vehicle 2 is in a situation in which it is necessary to protrude to the oncoming lane and avoid the stopped vehicle X. In this way, the autonomous driving control unit 36 stops the remote autonomous driving vehicle 2 just before the stopped vehicle X. The remote instruction request determination unit 34 transmits the remote instruction request to the remote instruction server 10. When the remote instruction server 10 receives the remote instruction request, the remote commander R issues a remote instruction to the remote autonomous driving vehicle 2 based on the remote instruction request. In this way, the remote autonomous driving vehicle 2 can avoid the stopped vehicle X by traveling by the remote driving based on the remote instruction.

In addition, when the remote instruction request is transmitted from the remote autonomous driving vehicle 2, the request occurring location determination unit 16 of the remote instruction server 10 stores the location P1 at which the remote instruction request was made and the time at which the remote instruction request was made at the location P1 in association with each other. The request occurring location determination unit 16 of the remote instruction server 10 determines whether the remote instruction request is transmitted at equal to or higher frequency than the instruction request frequency or not at the location P1. The location P1 is assumed to be a counting target location set in advance. If the remote instruction request is transmitted at equal to or higher frequency than the instruction request frequency at the location P1, the passing-detour location setting unit 18 sets the location P1 as the passing-detour location for the remote autonomous driving vehicle 2 in the map information stored in the map database 4.

Figure 7:
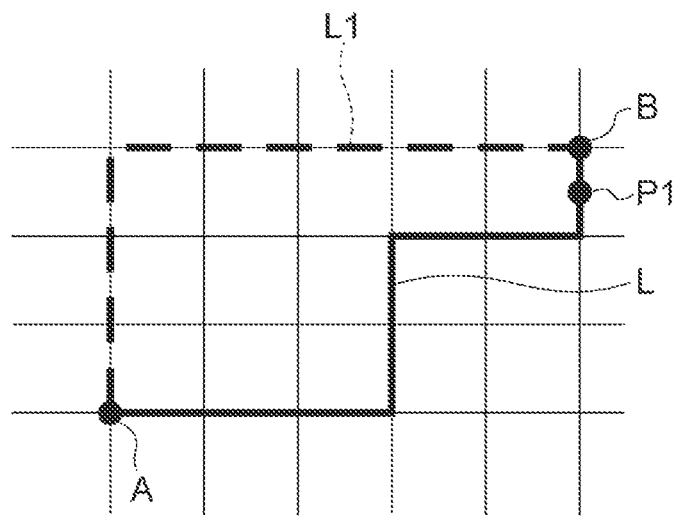
FIG. 7 is a diagram illustrating an example of setting a target route avoiding a passing-detour location.

As described above, the location from which the remote instruction request is transmitted at equal to or higher frequency than the instruction request frequency is set as the passing-detour location in the map information. In this case, when generating the target route for the remote autonomous driving vehicle 2 next time, the travel management unit 11 generates the target route avoiding the set passing-detour location. For example, as illustrated in FIG. 7, if the location P1 is set as the passing-detour location and a target route from the location A to the location B is generated, the travel management unit 11 can generate a target route L1 avoiding the location P1 as indicated by a broken line in FIG. 7. The target route L indicated by a solid line in FIG. 7 is the target route before the location P1 is set as the passing-detour location.

Figure 8:
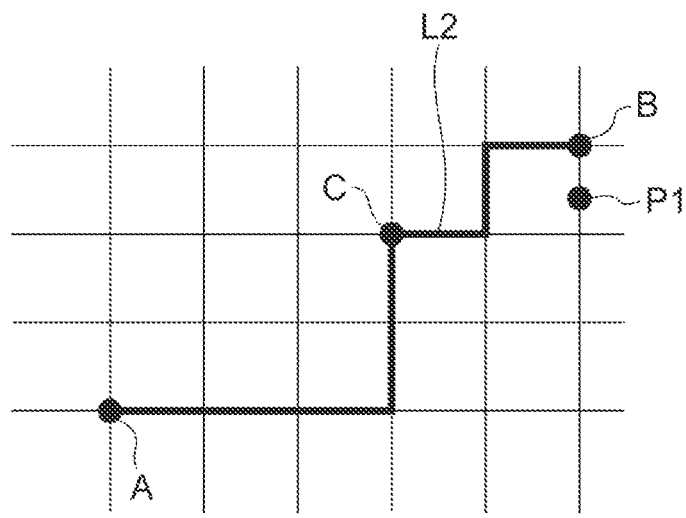
FIG. 8 is a diagram illustrating an example of setting a target route avoiding the passing-detour location.

In addition, for example, as illustrated in FIG. 8, as a target route L2 avoiding the location P1 for going from the location A to the location B, the travel management unit 11 may generate an optimal route (for example, an optimal route based on the travel distance, or the like) from location C which is one of the passing locations of the original target route L illustrated in FIG. 5 to the location B avoiding the location P1.

In the above description, an example of generating the target route from the location A to the location B avoiding the location P1 is described using FIG. 7 and FIG. 8, but the travel management unit 11 also generates the target route avoiding the location P1 which is the passing-detour location, when generating a target route from a departure location other than the location A to an arrival location other than the location B.

In addition, when the target route avoiding the passing-detour location is generated, the travel management unit 11 can transmit the position information on the passing-detour location and the reason why the remote instruction request at the passing-detour location was transmitted to the remote autonomous driving vehicle 2 together with the generated target route. The reason why the remote instruction request at the passing-detour location was transmitted is a reason that is collected by the remote instruction reason collection unit 17. In this case, the notification control unit 37 of the remote autonomous driving vehicle 2 notifies the occupant of the remote autonomous driving vehicle 2 of the reason why the remote instruction request at the passing-detour location was transmitted together with the target route avoiding the passing-detour location generated by the travel management unit 11 using the HMI 27.

Figure 9:
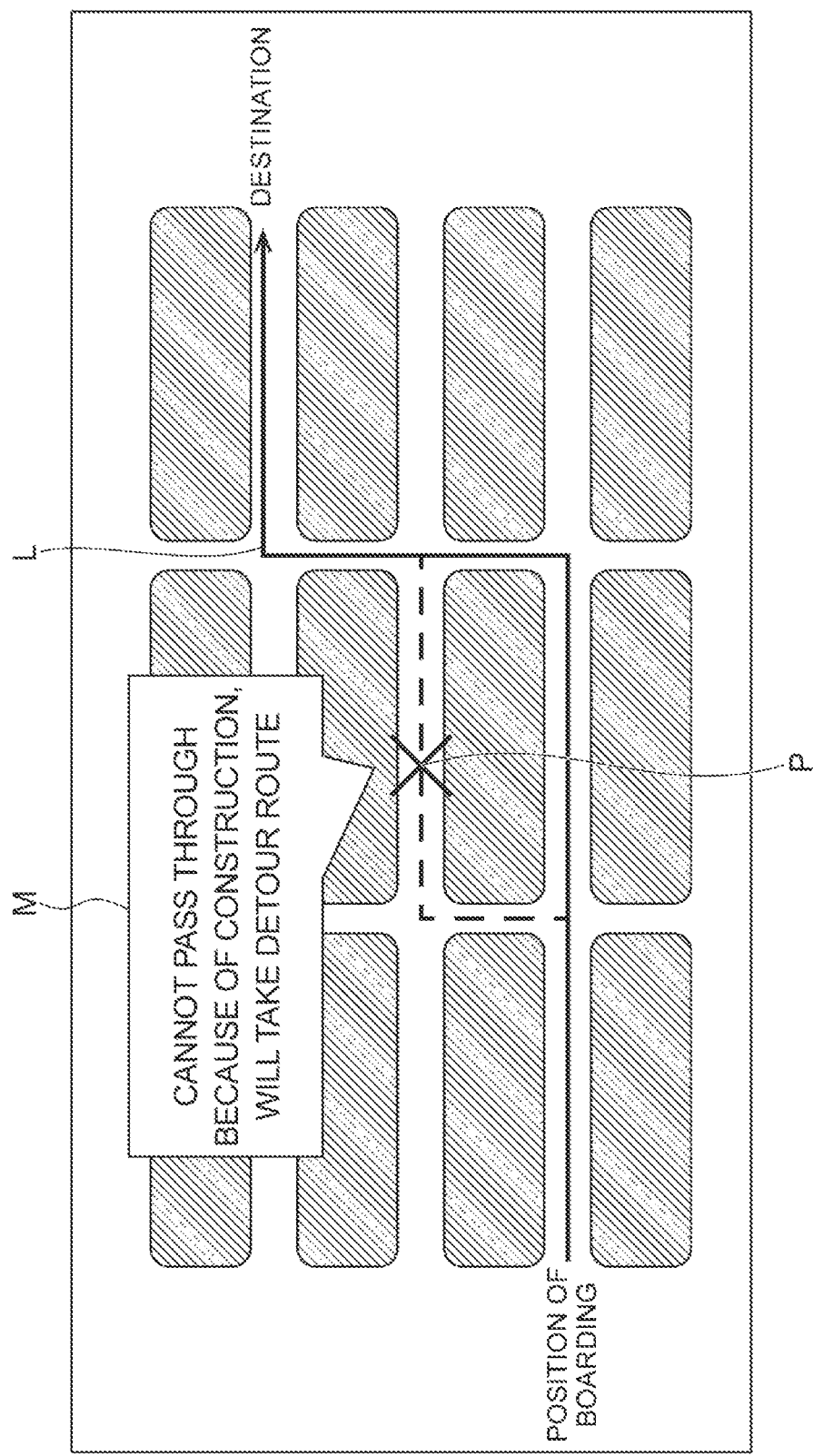
FIG. 9 is a diagram illustrating an example of a display screen that displays a reason why the remote instruction request is transmitted at the target route and the passing-detour location.

For example, as an example of a display screen illustrated in FIG. 9, the notification control unit 37 can display a target route L, a passing-detour location P, and a reason M why the remote instruction request at the passing-detour location P was transmitted, on the display of the HMI 27. In the example illustrated in FIG. 9, a target route L for the remote autonomous driving vehicle 2 to transport the occupant from the boarding position to the destination is illustrated. In addition, as the reason M why the remote instruction request at the passing-detour location P was transmitted, because the passing-detour location is under construction, an intention to take a detour route of bypassing the passing-detour location since the remote autonomous driving vehicle 2 cannot autonomously pass through the passing-detour location P by the autonomous driving, is displayed. Confirming the display, the occupant of the remote autonomous driving vehicle 2 can recognize the reason for traveling on the route avoiding the passing-detour location P.

The reason M may be displayed when the remote autonomous driving vehicle 2 approaches the passing-detour location where the passing is avoided, or may be displayed from the beginning of the display of the target route L. In addition, the reason M is not limited to notifying the occupant of the remote autonomous driving vehicle 2 together with the target route L. The notification control unit 37 may notify the occupant of the remote autonomous driving vehicle 2 only of the reason why the remote instruction request at the location set as the passing-detour location was transmitted.

Cancellation of Passing-Detour Location Setting

In addition, the passing-detour location setting unit 18 can cancel the setting of the passing-detour location. When the situation becomes such that the remote autonomous driving vehicle 2 can autonomously pass through the passing-detour location by the autonomous driving due to the moving of the stopped vehicle X stopped at the passing-detour location, the completion of the construction, and the like, the passing-detour location setting unit 18 cancels the setting of the passing-detour location. Here, the passing-detour location setting unit 18 cancels the setting of the passing-detour location set in the map information (deletes the passing-detour location). After the setting of the passing-detour location is canceled, the request occurring location determination unit 16 restarts the counting of the remote instruction request from 0 (zero) at the location where the setting of the passing-detour location is canceled.

Specifically, the passing-detour location setting unit 18 can cancel the setting of the passing-detour location based on the remote autonomous driving passage information. The remote autonomous driving passage information is information indicating whether or not the remote autonomous driving vehicle 2 can autonomously pass through the passing-detour location by the autonomous driving. The passing-detour location setting unit 18 can use the remote autonomous driving passage information transmitted by the above-described passage determination unit 38 of the remote autonomous driving vehicle 2, as the remote autonomous driving passage information. Hereinafter, the processing for transmitting the remote autonomous driving passage information by the remote autonomous driving vehicle 2, and processing for the cancellation of the passing-detour location setting by the passing-detour location setting unit 18, will be described.

As described above, the travel management unit 11 can manage the driving of the remote autonomous driving vehicle 2 by issuing an instruction of a target route to the remote autonomous driving vehicle 2 and causing the remote autonomous driving vehicle 2 to travel by the autonomous driving along the target route. Thus, for example, the travel management unit 11 issues the instruction of a target route passing through the passing-detour location to the remote autonomous driving vehicle 2 which is in a state in which services such as occupant transportation are not performed, and causes the remote autonomous driving vehicle 2 to travel so as to pass through the passing-detour location. As the remote autonomous driving vehicle 2 which is in a state in which services such as the occupant transportation are not performed, for example, a remote autonomous driving vehicle (for example, a probe car) which is dedicated for determining whether or not the vehicle can pass through the passing-detour location by the autonomous driving, may be used.

The remote autonomous driving vehicle 2 travels along the target route by the autonomous driving based on the instruction from the travel management unit 11. The passage determination unit 38 of the remote autonomous driving vehicle 2 determines whether it is possible to autonomously pass through the passing-detour location by the autonomous driving or not without making a remote instruction request. If it is possible to pass, the passage determination unit 38 determines that the vehicle can pass through the passing-detour location by the autonomous driving. The position information on the passing-detour location may be transmitted from the travel management unit 11 to the passage determination unit 38 of the remote autonomous driving vehicle 2 together with the target route.

If the vehicle can pass through the passing-detour location by the autonomous driving, the passage determination unit 38 transmits remote autonomous driving passage information indicating that the vehicle can pass through the passing-detour location by the autonomous driving, to the remote instruction server 10. The passing-detour location setting unit 18 cancels the setting of the passing-detour location based on the remote autonomous driving passage information transmitted from the remote autonomous driving vehicle 2. For example, as illustrated in FIG. 6, this case includes such a case that the location was set as a passing-detour location due to the presence of a stopped vehicle X in the lane, but the stopped vehicle X moved later and the remote autonomous driving vehicle 2 can pass through the passing-detour location by the autonomous driving, without making the remote instruction request.

On the other hand, it is assumed that when traveling along the target route, the remote autonomous driving vehicle 2 cannot pass through the passing-detour location by the autonomous driving, and passes through the passing-detour location by the remote driving by making the remote instruction request. In this case, the passage determination unit 38 determines that the vehicle cannot pass through the passing-detour location by the autonomous driving, and does not transmit the remote autonomous driving passage information to the remote instruction server 10. Therefore, the passing-detour location setting unit 18 does not cancel the setting of the passing-detour location.

As described above, if the passing-detour location is set, the travel management unit 11 issues an instruction of the target route avoiding the passing-detour location, to the remote autonomous driving vehicle 2. In addition, the travel management unit 11 issues the instruction of the target route passing through the passing-detour location, to a remote autonomous driving vehicle 2 that does not performs the services such as the occupant transportation. In this way, the travel management unit 11 causes the remote autonomous driving vehicle 2 to determine whether or not the vehicle can pass through the passing-detour location by the autonomous driving. The passing-detour location setting unit 18 can cancel the setting of the passing-detour location based on the result of travel (remote autonomous driving passage information) of the remote autonomous driving vehicle 2.

The travel management unit 11 can constantly monitor the position of the remote autonomous driving vehicle 2. In this case, if the remote autonomous driving vehicle 2 can pass through the passing-detour location by the autonomous driving without the remote instruction, the travel management unit 11 may determine that the remote autonomous driving vehicle 2 can passed the passing-detour location by the autonomous driving. That is, it is not necessary for the passage determination unit 38 of the remote autonomous driving vehicle 2 to determine whether or not the vehicle can pass through the passing-detour location by the autonomous driving. If the remote autonomous driving vehicle 2 can pass through the passing-detour location by the autonomous driving, the travel management unit 11 may output the remote autonomous driving passage information indicating that the remote autonomous driving vehicle 2 can pass through the passing-detour location by the autonomous driving, to the passing-detour location setting unit 18. In this case, the passing-detour location setting unit 18 can cancel the setting of the passing-detour location based on the remote autonomous driving passage information output from the travel management unit 11.

Flow of Processing by Vehicle Remote Instruction System

Figure 10:
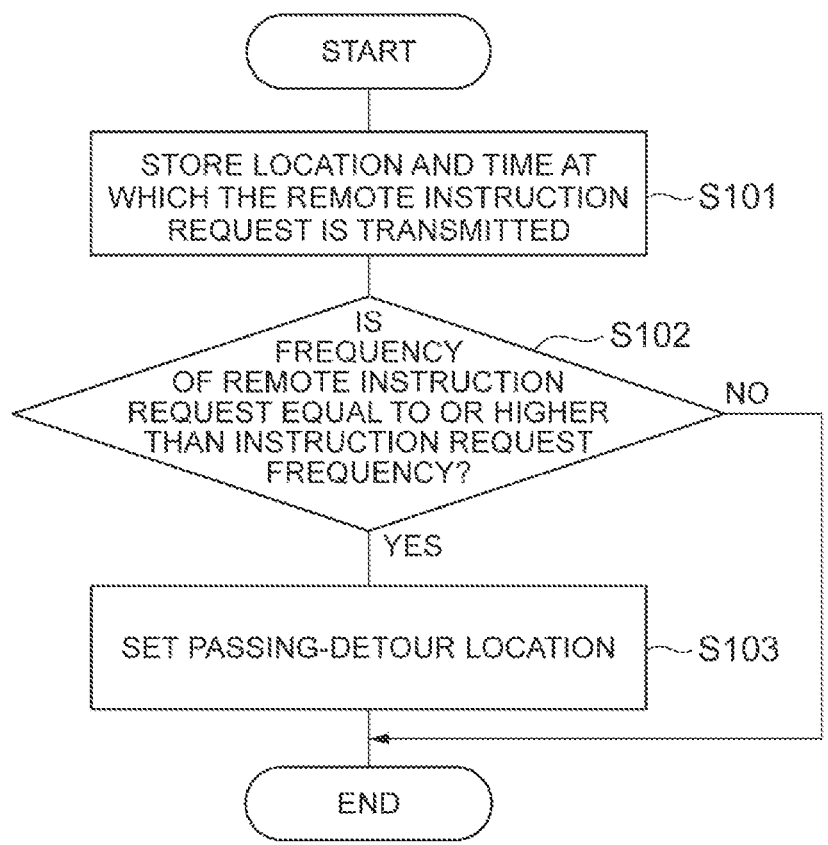
FIG. 10 is a flowchart illustrating a flow of processing by the remote instruction server for setting the passing-detour location.

First, a flow of processing by the remote instruction server 10 for setting the passing-detour location based on the remote instruction request from the remote autonomous driving vehicle 2 a will be described. FIG. 10 is a flowchart illustrating the flow of processing by the remote instruction server 10 for setting the passing-detour location. The processing illustrated in FIG. 10 is performed while the remote autonomous driving vehicle 2 executes the service provided by the vehicle remote instruction system 100. In addition, the processing illustrated in FIG. 10 starts when the remote instruction request is transmitted when the remote autonomous driving vehicle 2 providing the service is traveling along the target route, and the transmitted remote instruction request is received by the remote instruction server 10. Here, a case where the remote instruction request is transmitted at the counting target location will be described. In addition, although not described below, a remote instruction by the remote commander R is issued based on the remote instruction request from the remote autonomous driving vehicle 2 in parallel with the processing by the remote instruction server 10 for setting the passing-detour location.

As illustrated in FIG. 10, when a remote instruction request from remote autonomous driving vehicle 2 is received, the request occurring location determination unit 16 stores the location where the remote instruction request is made and the time at which the remote instruction request is made at the location, in association with each other (S101). In addition, the request occurring location determination unit 16 stores the reason acquired by the remote instruction reason collection unit 17 in association with the location where the remote instruction request is made.

Then, the request occurring location determination unit 16 determines whether or not the remote instruction request is transmitted at equal to or higher frequency than the instruction request frequency set in advance at the location where the remote instruction request is transmitted (S102). If the frequency of the transmission of the remote instruction request is equal to or higher than the instruction request frequency (YES in S102), the passing-detour location setting unit 18 sets the location where the remote instruction request is transmitted as the passing-detour location (S103). On the other hand, if the frequency of the transmission of the remote instruction request is not equal to or higher than the instruction request frequency (NO in S102), the remote instruction server 10 ends the current processing, and then performs the processing in S101 again when the remote instruction request is received by the remote instruction server 10.

Figure 11:
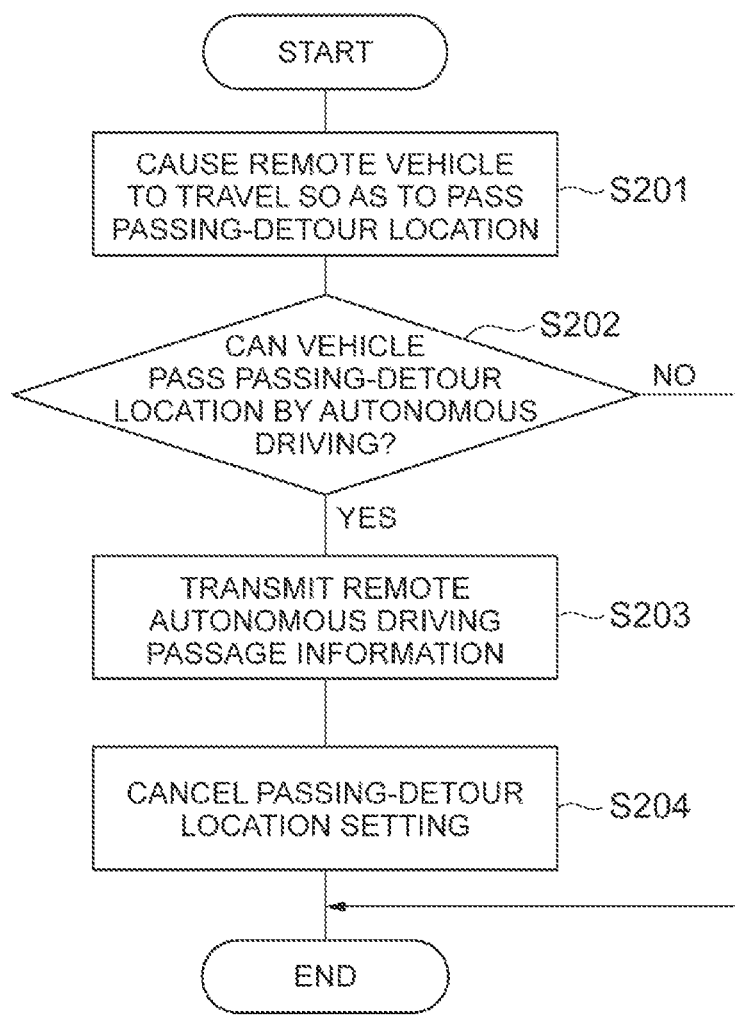
FIG. 11 is a flowchart illustrating a flow of processing for the cancellation of the passing-detour location setting performed in the vehicle remote instruction system.

Next, a flow of processing for the cancellation of the passing-detour location setting performed in the vehicle remote instruction system 100 will be described. FIG. 11 is a flowchart illustrating the flow of processing for the cancellation of the passing-detour location setting performed in the vehicle remote instruction system 100. The processing illustrated in FIG. 11 is started at a timing set in advance, for example, when the remote autonomous driving vehicle 2 that does not provide services such as occupant transportation is present.

As illustrated in FIG. 11, the travel management unit 11 issues an instruction of a target route passing through the passing-detour location to the remote autonomous driving vehicle 2 in a state of not providing the services such as occupant transportation, and causes the remote autonomous driving vehicle 2 to travel so as to the passing-detour location (S201). The passage determination unit 38 of the remote autonomous driving vehicle 2 determines whether or not the vehicle can pass through the passing-detour location by the autonomous driving (S202). If it is determined that the vehicle can pass through the passing-detour location by the autonomous driving (YES in S202), the passage determination unit 38 of the remote autonomous driving vehicle 2 transmits remote autonomous driving passage information indicating that the vehicle can pass through the passing-detour location by the autonomous driving to the remote instruction server 10. (S203)

When receiving the remote autonomous driving passage information, the passing-detour location setting unit 18 of the remote instruction server 10 cancels the setting of the passing-detour location (S204). In this way, the travel management unit 11 can generate the target route passing through the location which was set as the passing-detour location. On the other hand, if it is determined that the vehicle cannot pass through the passing-detour location by the autonomous driving and the remote instruction request is made (NO in S202), the vehicle remote instruction system 100 ends the current processing and performs the processing in S201 again at a timing set in advance.

Figure 12:
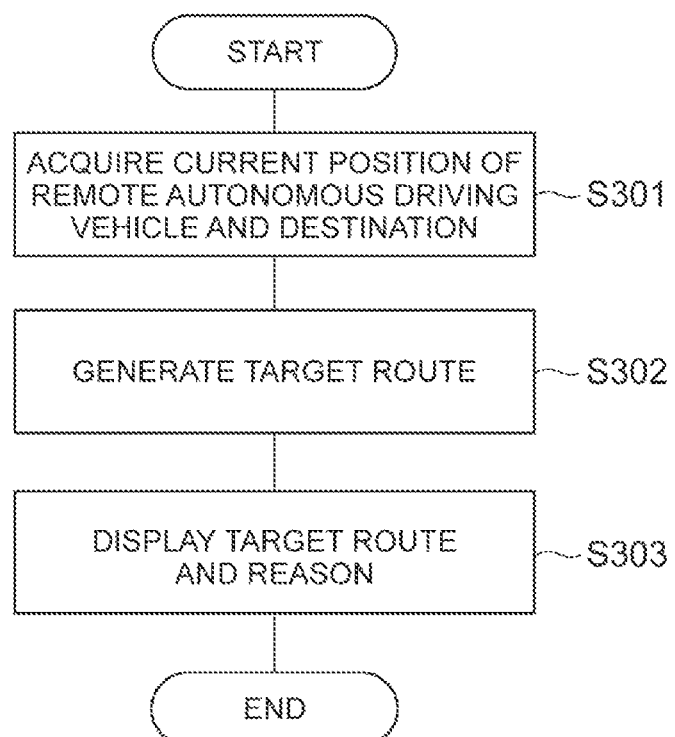
FIG. 12 is a flowchart illustrating a flow of processing for generating a target route and managing the driving of the remote autonomous driving vehicle performed in the vehicle remote instruction system.

Next, a flow of processing for managing the driving of the remote autonomous driving vehicle 2 performed in the vehicle remote instruction system 100 will be described. FIG. 12 is a flowchart illustrating the flow of processing for generating the target route and managing the driving of the remote autonomous driving vehicle 2 performed in the vehicle remote instruction system 100. The processing illustrated in FIG. 12 is started based on a request to start traveling of the remote autonomous driving vehicle 2.

As illustrated in FIG. 12, when the request to start traveling of the remote autonomous driving vehicle 2 is performed, the travel management unit 11 of the remote instruction server 10 acquires the current position of the remote autonomous driving vehicle 2 and the destination according to the service provided by the remote autonomous driving vehicle 2 (S301). The travel management unit 11 generates a target route to the destination. In addition, when generating the target route, if a passing-detour location is present on the route to the destination based on the map information of map database 4, the travel management unit 11 generates the target route avoiding the passing-detour location (S302).

The travel management unit 11 transmits the target route to the remote autonomous driving vehicle 2. If the target route avoiding the passing-detour location is generated, the travel management unit 11 transmits the position information of the passing-detour location and the reason why the remote instruction request was transmitted from the passing-detour location (the reason collected by the remote instruction reason collection unit 17) to the remote autonomous driving vehicle 2 together with the target route. When the target route is received, the notification control unit 37 of the remote autonomous driving vehicle 2 displays the acquired target route on the display of the HMI 27, and presents the target route to the occupant. In addition, if the reason why the remote instruction request was transmitted from the passing-detour location is received together with the target route, as in the display screen example illustrated in FIG. 9, the notification control unit 37 causes the display of the HMI 27 to display the target route L, the passing-detour location P, and the reason M why the remote instruction request is transmitted from the passing-detour location P (S303). Then, the remote autonomous driving vehicle 2 autonomously travels based on the target route received from the remote instruction server 10.

As described above, the vehicle remote instruction system 100 can set a location where the frequency of remote instruction request is equal to or higher than the instruction request frequency as a passing-detour location in the remote autonomous driving vehicle 2. In this way, by setting the passing-detour location, the vehicle remote instruction system 100 can suppress the remote autonomous driving vehicle 2 from passing through the location where the remote instruction request occurs. As a result, the vehicle remote instruction system 100 can reduce the load on the remote commander R.

The travel management unit 11 of the remote instruction server 10 generates the route avoiding the passing-detour location as the target route of the remote autonomous driving vehicle 2, and transmits the generated target route to the remote autonomous driving vehicle 2. In this way, the vehicle remote instruction system 100 can cause the remote autonomous driving vehicle 2 to travel by the autonomous driving while avoiding the passing-detour location where the frequency of remote instruction request is high. As described above, the vehicle remote instruction system 100 can cause the remote autonomous driving vehicle 2 to travel by the autonomous driving while suppressing the remote instruction from the remote commander R.

The notification control unit 37 of the remote autonomous driving vehicle 2 notifies the occupant of the reason why the remote instruction request was transmitted from the passing-detour location using the HMI 27. In this case, the occupant of the remote autonomous driving vehicle 2 can recognize the reason why the remote instruction request was transmitted from the passing-detour location, that is, the reason why the passing-detour location is set.

If the situation is such that the remote autonomous driving vehicle 2 can pass through the passing-detour location by the autonomous driving, the passing-detour location setting unit 18 of the remote instruction server 10 cancels the setting of the passing-detour location. Specifically, the passing-detour location setting unit 18 cancels the setting as the passing-detour location based on the remote autonomous driving passage information transmitted from the passage determination unit 38 of the remote autonomous driving vehicle 2 or based on the remote autonomous driving passage information output from the travel management unit 11 that constantly monitors the position of the remote autonomous driving vehicle 2. In this case, the vehicle remote instruction system 100 can appropriately cancel the setting of the passing-detour location.

The passing-detour location setting unit 18 of the remote instruction server 10 may cancel the setting of the passing-detour location based on the autonomous driving passage information transmitted from the autonomous driving vehicle, instead of the remote autonomous driving passage information indicating that the remote autonomous driving vehicle 2 can pass through the passing-detour location by the autonomous driving. The autonomous driving vehicle here is a vehicle in which the manual driving and the autonomous driving can be switched by a driver, and is a vehicle that does not perform the remote driving like the remote autonomous driving vehicle 2. For example, if the autonomous driving vehicle can pass through the passing-detour location by the autonomous driving without switching to the manual driving at the passing-detour location, the autonomous driving vehicle transmits the autonomous driving passage information indicating whether the autonomous driving vehicle can pass through the passing-detour location by the autonomous driving or not, to the remote instruction server 10. The passing-detour location setting unit 18 of the remote instruction server 10 can cancel the setting of the passing-detour location based on the autonomous driving passage information transmitted from the autonomous driving vehicle. In addition, for example, the travel management unit 11 of the remote instruction server 10 may constantly monitor the position of the autonomous driving vehicle and the driving state of the autonomous driving vehicle (the type of driving between the autonomous driving and the manual driving). In this case, when the autonomous driving vehicle can pass through the passing-detour location by the autonomous driving without switching to the manual driving, the travel management unit 11 may output the autonomous driving passage information indicating that the vehicle can pass through the passing-detour location by the autonomous driving, to the passing-detour location setting unit 18. Then, the passing-detour location setting unit 18 may cancel the setting of the passing-detour location based on the autonomous driving passage information output from the travel management unit 11. That is, if the autonomous driving vehicle can pass through the passing-detour location by the autonomous driving based on the autonomous driving passage information, the passing-detour location setting unit 18 cancels the setting of the passing-detour location. In this case, the autonomous driving vehicle does not need to transmit the autonomous driving passage information to the remote instruction server 10. The autonomous driving vehicle may be, for example, a vehicle that provides services such as the occupant transportation, or may be a dedicated autonomous driving vehicle (for example, a probe car or the like) that determines whether the vehicle can pass through the passing-detour location by the autonomous driving or not.

First Modification Example of Cancellation of Setting

Figure 13:
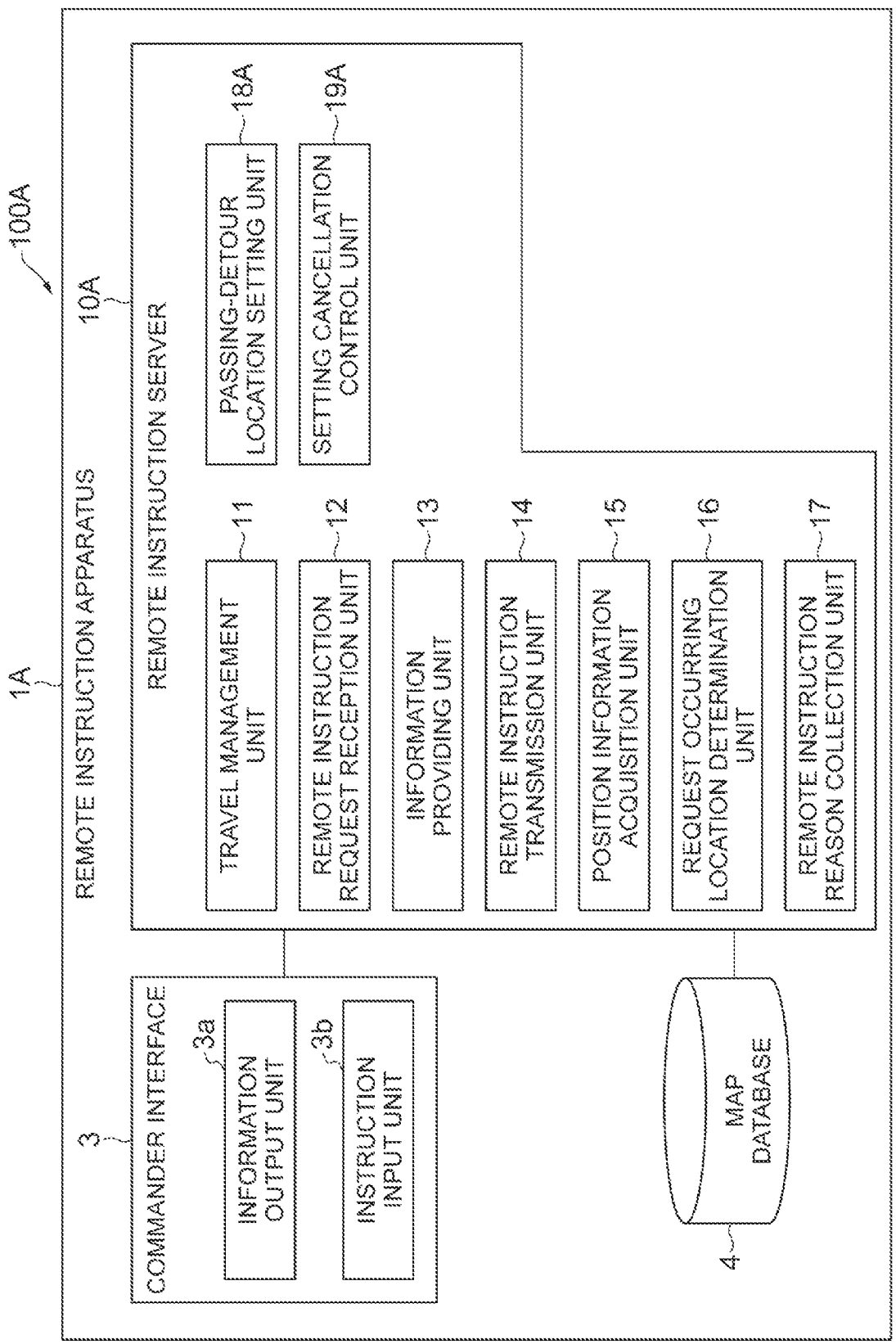
FIG. 13 is a block diagram illustrating an example of a configuration of a remote instruction apparatus in a first modification example for the cancellation of the passing-detour location setting.

Next, a first modification example of canceling the setting of the passing-detour location performed by the passing-detour location setting unit of the remote instruction server will be described. As illustrated in FIG. 13, a remote instruction server 10A of a remote instruction apparatus 1A in the present modification example includes a passing-detour location setting unit 18A instead of the passing-detour location setting unit 18 of the remote instruction server 10 in the first embodiment. In addition, the remote instruction server 10A further includes a setting cancellation control unit 19A. Other configurations of the remote instruction apparatus 1A is the same as the configurations of the remote instruction apparatus 1 in the first embodiment, and the same reference numerals are given and the detailed description will not be repeated. The descriptions will be focused on the differences from the vehicle remote instruction system 100 in the first embodiment. Although detailed description will be omitted, but the vehicle remote instruction system 100A in the present modification example also issues remote instruction to the remote autonomous driving vehicle 2 in the same manner as the vehicle remote instruction system 100 in the first embodiment.

In the present modification example, the remote instruction apparatus 1A causes a terminal user (a user of the user terminal 5 described later) at the passing-detour location to determine whether or not the remote autonomous driving vehicle 2 can pass through the passing-detour location by the autonomous driving, cancels the setting of the passing-detour location based on the result of determination by the terminal user.

Specifically, the passing-detour location setting unit 18A sets the passing-detour location in the same manner as the passing-detour location setting unit 18 in the first embodiment. In addition, the passing-detour location setting unit 18A cancels the setting of the passing-detour location based on passing-detour location situation information indicating the situation of the passing-detour location. The passing-detour location situation information is transmitted from the user terminal 5 illustrated in FIG. 14. In the present modification example, the passing-detour location situation information is, for example, information indicating that the situation is such that the remote autonomous driving vehicle 2 can pass through the passing-detour location by the autonomous driving. As will be described in detail later, if the situation is such that the remote autonomous driving vehicle 2 can pass through the passing-detour location by the autonomous driving, the terminal user transmits the passing-detour location situation information to the remote instruction server 10A via the user terminal 5. As described above, the passing-detour location setting unit 18A cancels the setting of the passing-detour location based on the passing-detour location situation information transmitted from the terminal user.

The setting cancellation control unit 19A transmits setting cancellation determination information to the user terminal 5 of the terminal user at the passing-detour location, based on the position information on the user terminal 5. The setting cancellation determination information is information for determining whether or not the remote autonomous driving vehicle 2 can pass through the passing-detour location by the autonomous driving. The setting cancellation determination information includes the position information on the passing-detour location. In addition, the setting cancellation determination information may include at least one of the reason why the remote autonomous driving vehicle 2 cannot pass through the passing-detour location by the autonomous driving and the situation of the passing-detour location. The reason why the remote autonomous driving vehicle 2 cannot pass through the passing-detour location by the autonomous driving is the reason why the remote instruction request was transmitted, and thus, may be the reason collected by the remote instruction request collection unit 17 (for example, the presence of a stopped vehicle, or the like). The situation of the passing-detour location may include the image information indicating the situation of the passing-detour location. For example, the situation of the passing-detour location may include the image information in which the stopped vehicle is imaged. As this image information, the travel situation information transmitted when the remote autonomous driving vehicle 2 makes the remote instruction request may be used.

Figure 14:
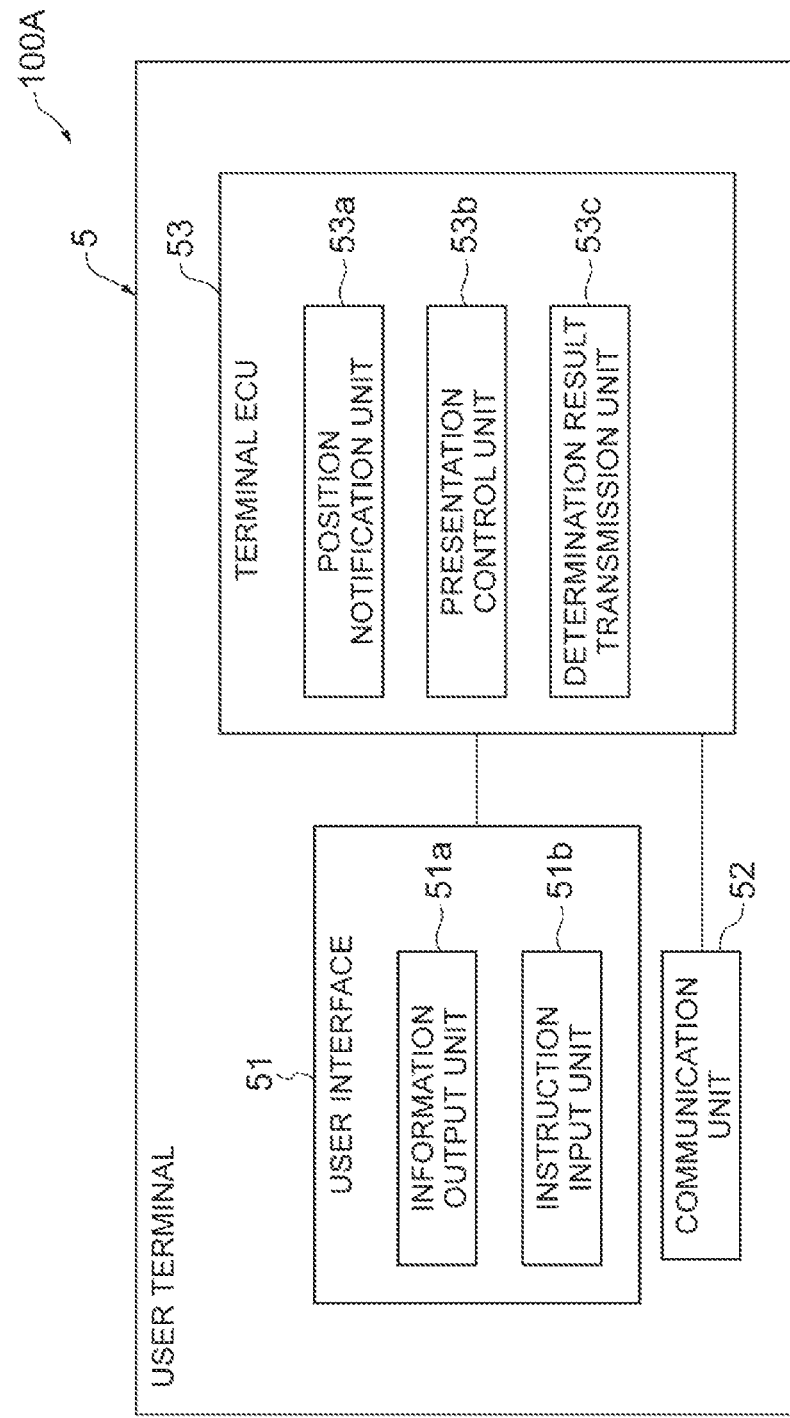
FIG. 14 is a block diagram illustrating an example of a configuration of a user terminal.

As illustrated in FIG. 14, the vehicle remote instruction system 100A further includes a user terminal 5. The user terminal 5 is communicably connected to the remote instruction apparatus 1A via the network N. The user terminal 5 is carried by the terminal user. The terminal user here is, for example, a person who is present at the passing-detour location, such as a pedestrian walking at the passing-detour location. The terminal user may be an management staff of the vehicle remote instruction system, or may be a general person other than the management staff.

The user terminal 5 includes a user interface 51, a communication unit 52, and a terminal ECU 53. The user interface 51 inputs and outputs information to and from the terminal user. The user interface 51 includes an information output unit 51a and an instruction input unit 51b.

The information output unit 51a includes, for example, a display that outputs an image. The setting cancellation determination information transmitted from the remote instruction server 10A is displayed o the display. For example, the position of the passing-detour location is displayed on the display. For example, the reason why the remote autonomous driving vehicle 2 cannot pass through the passing-detour location by the autonomous driving (such as the presence of a stopped vehicle) may be displayed on the display. For example, an image (such as an image of a stopped vehicle) indicating the situation of the passing-detour location may be displayed on the display.

The instruction input unit 51b receives an input operation by the terminal user. Here, the terminal user visually recognizes the passing-detour location based on the setting cancellation determination information output through the information output unit 51a, and confirms the situation of the passing-detour location. Then, the terminal user determines whether or not the situation is such that the remote autonomous driving vehicle 2 can pass through the passing-detour location by the autonomous driving. For example, if the situation is changed to a situation where the remote autonomous driving vehicle 2 can pass through the passing-detour location by the autonomous driving such as when the stopped vehicle stopped at the passing-detour location moves or the construction is completed, the terminal user determines that the situation is such that the remote autonomous driving vehicle 2 can pass through the passing-detour location by the autonomous driving. Then, the terminal user inputs fact that the remote autonomous driving vehicle 2 can pass through the passing-detour location by the autonomous driving to the instruction input unit 51b.

The communication unit 52 is a communication device that controls wireless communication with the outside of the user terminal 5. The communication unit 52 transmits and receives various information to and from the remote instruction apparatus 1A (remote instruction server 10A) via the network N.

The terminal ECU 53 is an electronic control unit including a CPU, ROM, RAM, and the like. In the terminal ECU 53, for example, a program recorded in the ROM is loaded into the RAM, and various functions are realized by executing the program loaded into the RAM by the CPU.

Functionally, the terminal ECU 53 includes a position notification unit 53a, a presentation control unit 53b, and a determination result transmission unit 53c.

The position notification unit 53a notifies the remote instruction server 10A of the position information on the user terminal 5 via the communication unit 52. For example, the position notification unit 53a can acquire the position information on the user terminal 5 based on the position information on the GPS receiver included in the user terminal 5 in the similar manner as the vehicle position acquisition unit 31 of the remote autonomous driving vehicle 2 described with reference to FIG. 2. Various well-known methods can be used as the method of acquiring the position information on the user terminal 5. The setting cancellation control unit 19A of the remote instruction server 10A can determine whether the terminal user carrying the user terminal 5 is at the passing-detour location or not based on the position information of the user terminal 5 notified by the position notification unit 53a. Here, if the position of the user terminal 5 is within a distance set in advance from the passing-detour location, the setting cancellation control unit 19A may determine that the terminal user carrying the user terminal 5 is at the passing-detour location. The setting cancellation control unit 19A transmits the setting cancellation determination information to the user terminal 5 of the terminal user at the passing-detour location.

Here, the position notification unit 53a notifies of the position information of the user terminal 5 at a timing set in advance. When the position of the user terminal 5 is the passing-detour location, the setting cancellation control unit 19A of the remote instruction server 10A can transmit the setting cancellation determination information on the passing-detour location.

The presentation control unit 53b receives the setting cancellation determination information transmitted from the setting cancellation control unit 19A of the remote instruction server 10A, and outputs the received setting cancellation determination information from the information output unit 51a.

The determination result transmission unit 53c transmits the result of determination whether or not the remote autonomous driving vehicle 2 can pass through the passing-detour location by the autonomous driving performed by the terminal user, to the remote instruction server 10A. Here, if the terminal user inputs a fact that the remote autonomous driving vehicle 2 can pass through the passing-detour location by the autonomous driving into the instruction input unit 51b, the determination result transmission unit 53c transmits the passing-detour location situation information indicating that the situation is such that the remote autonomous driving vehicle 2 can pass through the passing-detour location by the autonomous driving, to the remote instruction server 10A.

Flow of Processing in Vehicle Remote Instruction System

Figure 15:
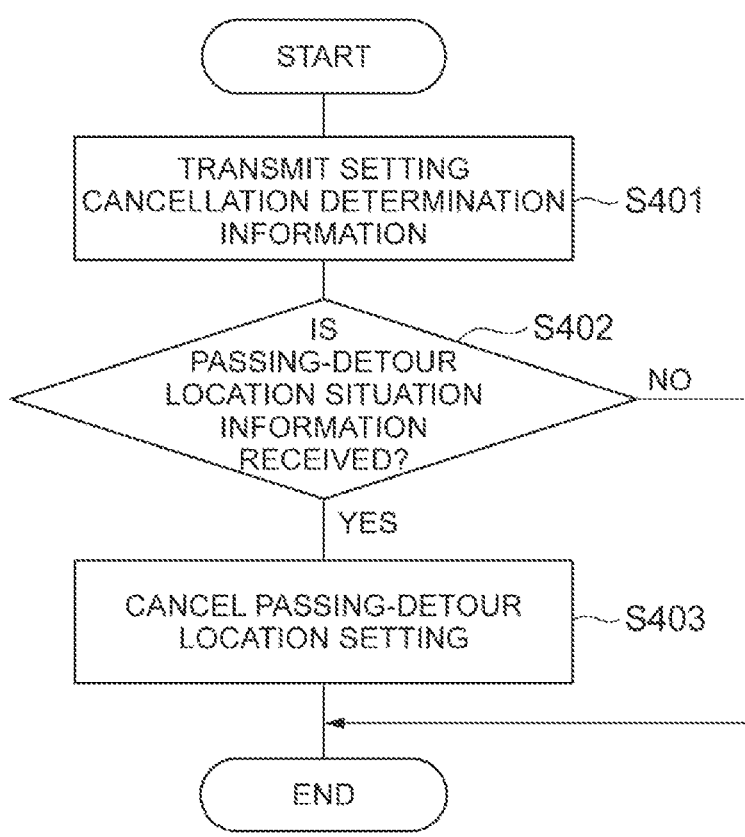
FIG. 15 is a flowchart illustrating a flow of processing for the cancellation of the passing-detour location setting performed in the remote instruction server.

Next, a flow of processing for the cancellation of the passing-detour location setting performed in the remote instruction server 10A will be described. FIG. 15 is a flowchart illustrating the flow of processing for the cancellation of the passing-detour location setting performed in the remote instruction server 10A. The processing illustrated in FIG. 15 is started when the terminal user of the user terminal 5 arrives at the passing-detour location.

When the terminal user carrying the user terminal 5 arrives at the passing-detour location, the setting cancellation control unit 19A transmits the setting cancellation determination information on the passing-detour location where the terminal user is present, to the user terminal 5 based on the position information transmitted from the user terminal 5 (S401). The terminal user of the user terminal 5 checks the passing-detour location and determines whether or not the situation is such that the remote autonomous driving vehicle 2 can pass through the passing-detour location by the autonomous driving based on the setting cancellation determination information. When it is determined that the situation is such that the vehicle can pass, the terminal user inputs that effect to the instruction input unit 51b.

After transmitting the setting cancellation determination information to the user terminal 5, the setting cancellation control unit 19A determines whether or not the passing-detour location situation information indicating that the situation is such that the remote autonomous driving vehicle 2 can pass through the passing-detour location by the autonomous driving is received from the user terminal 5 (S402). If the passing-detour location situation information is received (YES in S402), the passing-detour location setting unit 18A cancels the setting of the passing-detour location based on the passing-detour location situation information (S403). On the other hand, if the passing-detour location situation information is not received (NO in S402), the passing-detour location setting unit 18A maintains the passing-detour location setting, and ends the current processing.

As described above, in the vehicle remote instruction system 100A in the present modification example, the terminal user carrying the user terminal 5 determines whether or not the remote autonomous driving vehicle 2 can pass through the passing-detour location by the autonomous driving. Then, the vehicle remote instruction system 100A can cancel the setting of the passing-detour location based on the result of determination performed by the terminal user. In this way, the vehicle remote instruction system 100A can appropriately cancel the setting of the passing-detour location. In addition, an image indicating the reason why the remote autonomous driving vehicle 2 cannot pass through the passing-detour location by the autonomous driving and/or indicating the situation of the passing-detour location, may be displayed on the display of the information output unit 51a of the user terminal 5. In this case, the terminal user can easily recognize the difference from the current situation at the passing-detour location, and can easily determine whether or not the situation is such that the remote autonomous driving vehicle 2 can pass through the passing-detour location by the autonomous driving.

Second Modification Example of Cancellation of Setting

Figure 16:
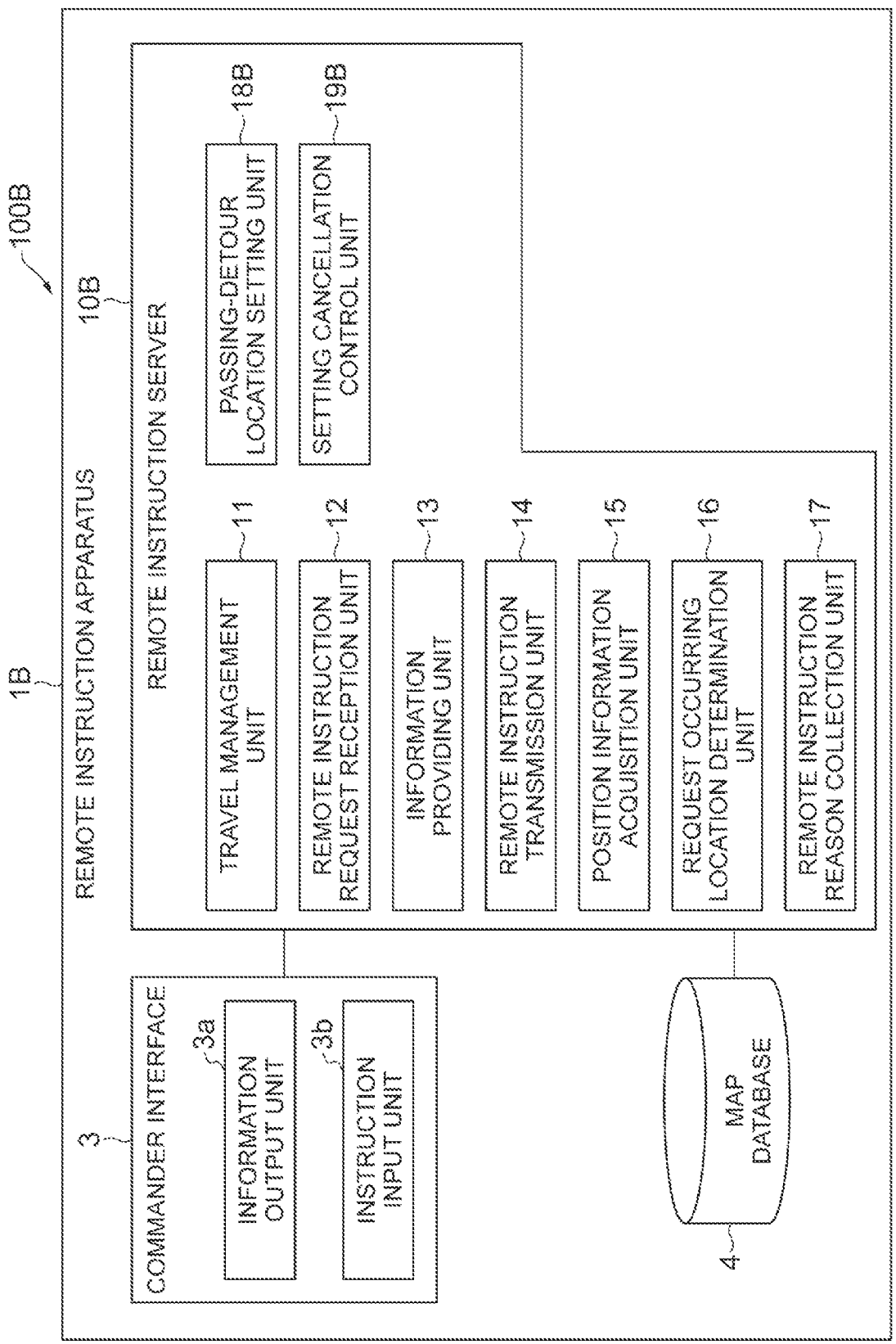
FIG. 16 is a block diagram illustrating an example of a configuration of a remote instruction apparatus in a second modification example for the cancellation of the passing-detour location setting.

Next, a second modification example of the cancellation of the passing-detour location setting performed by the passing-detour location setting unit of the remote instruction server will be described. As illustrated in FIG. 16, a remote instruction server 10B of a remote instruction apparatus 1B in the present modification example includes a passing-detour location setting unit 18B instead of the passing-detour location setting unit 18 of the remote instruction server 10 in the first embodiment. In addition, the remote instruction server 10B further includes a setting cancellation control unit 19B. Other configurations of the remote instruction apparatus 1B is the same as the configurations of the remote instruction apparatus 1 in the first embodiment, and the same reference numerals will be given, and the detailed description will not be repeated. The descriptions will be focused on the differences from the vehicle remote instruction system 100 in the first embodiment. Although detailed description will be omitted, but the vehicle remote instruction system 100B in the present modification example also issues the remote instruction to the remote autonomous driving vehicle 2 in the same manner as the vehicle remote instruction system 100 in the first embodiment.

Figure 17:
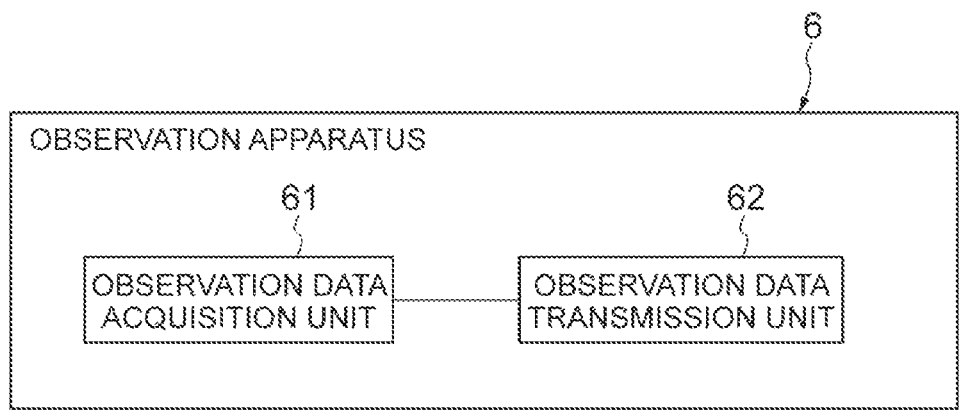
FIG. 17 is a block diagram illustrating an example of a configuration of an observation apparatus.

In the present modification example, the remote instruction apparatus 1B acquires observation data of the passing-detour location observed by the observation apparatus 6 (refer to FIG. 17). The remote instruction apparatus 1B cancels the setting of the passing-detour location based on the result of determination whether or not the remote autonomous driving vehicle 2 can pass through passing-detour location by the autonomous driving determined based on the observation data. Whether or not the remote autonomous driving vehicle 2 can pass through the passing-detour location by the autonomous driving may be determined by the remote instruction apparatus 1B based on the observation data, or may be determined by a person (for example, the management staff of the remote instruction apparatus 1B) based on the observation data.

Specifically, as illustrated in FIG. 17, the vehicle remote instruction system 100B further includes an observation apparatus 6. The observation apparatus 6 is communicably connected to the remote instruction apparatus 1B via the network N. The observation apparatus 6 observes the situation at the passing-detour location.

For example, the observation apparatus 6 may be installed on a support or a wall provided on the shoulder of the road so that the situation of the road can be observed. The observation apparatus 6 may be installed at a plurality of locations. In addition, for example, the observation apparatus 6 may be mounted on moving means such as a drone. The observation apparatus 6 may be mounted on each of a plurality of moving means.

The observation apparatus 6 includes an observation data acquisition unit 61 and an observation data transmission unit 62. The observation data acquisition unit 61 is a sensor for observing the external situation of the observation apparatus 6. The observation data acquisition unit 61 may be, for example, a camera or a radar sensor (for example, the LIDAR).

The observation data transmission unit 62 transmits the observation data observed by the observation data acquisition unit 61 to the remote instruction server 10B of the remote instruction apparatus 1B via the network N. The observation data transmission unit 62 may always transmit the observation data acquired by the observation data acquisition unit 61 to the remote instruction server 10B regardless of whether the situation of the passing-detour location is included in the observation data or not. In addition, the observation data transmission unit 62 may acquire the position information on the passing-detour location and may transmit the observation data to the remote instruction server 10B only when the situation of the passing-detour location is observed by the observation data acquisition unit 61. In this case, the observation data transmission unit 62 may acquire the position information on the passing-detour location from the remote instruction server 10B, and may determine whether the situation of the passing-detour location is observed by the observation data acquisition unit 61 or not. In addition, if the situation of the passing-detour location is observed by the observation data acquisition unit 61, the observation data transmission unit 62 may periodically transmit the observation data to the remote instruction server 10B at a timing set in advance, or may transmit the observation data to the remote instruction server 10B when any change is detected in the observation data, such as when movement of an object is detected.

As illustrated in FIG. 16, the setting cancellation control unit 19B of the remote instruction server 10B determines whether or not the situation is such that the remote autonomous driving vehicle 2 can pass through the passing-detour location by the autonomous driving based on the observation data indicating the situation of the passing-detour location transmitted from the observation apparatus 6. For example, if the situation changes to a situation where the remote autonomous driving vehicle 2 can pass through the passing-detour location by the autonomous driving, such as when the stopped vehicle stopped at the passing-detour location moves or the construction is completed, the setting cancellation control unit 19B determines that the situation is such that the remote autonomous driving vehicle 2 can pass through the passing-detour location by the autonomous driving. Here, for example, the setting cancellation control unit 19B can recognize an object such as a stopped vehicle based on a known object recognition technology or the like, and determine the situation.

Alternatively, the setting cancellation control unit 19B displays the observation data indicating the situation of the passing-detour location transmitted from the observation apparatus 6 on a display connected to the remote instruction server 10B so that the management staff of the remote instruction server 10B can recognize the observation data. The management staff may determine whether or not the situation is such that the remote autonomous driving vehicle 2 can pass through the passing-detour location by the autonomous driving, based on the situation of the passing-detour location displayed on the display, and may input the result of determination to the remote instruction server 10B. As described above, the remote instruction server 10B can cause a person such as the management staff to determine whether or not the remote autonomous driving vehicle 2 can pass through the passing-detour location by the autonomous driving.

As described above, for example, in some cases, the observation apparatus 6 may transmit the observation data to the remote instruction server 10B regardless of whether or not the situation of the passing-detour location is included in the observation data. This case, for example, is a case where the location imaged by the camera (observation data acquisition unit 61) installed on the side of the road is not the passing-detour location at the current time. In this case, the setting cancellation control unit 19B may determine whether the observation data indicates the situation of the passing-detour location or not based on the position information on the observation apparatus 6 and the position information on the passing-detour location. In some cases, the observation apparatus 6 acquires the position information on the passing-detour location and transmits the observation data indicating the situation on the passing-detour location to the remote instruction server 10B. In this case, the setting cancellation control unit 19B may use the observation data transmitted from the observation apparatus 6 as the observation data indicating the situation on the passing-detour location.

The passing-detour location setting unit 18B sets the passing-detour location in the same manner as the passing-detour location setting unit 18 in the first embodiment. The passing-detour location setting unit 18B cancels the setting of the passing-detour location based on the result of determination performed by the setting cancellation control unit 19B or the result of determination performed by a person such as the management staff. Here, the passing-detour location setting unit 18B cancels the setting of the passing-detour location when it is determined that the remote autonomous driving vehicle 2 can pass through the passing-detour location by the autonomous driving.

Flow of Processing in Vehicle Remote Instruction System

Figure 18:
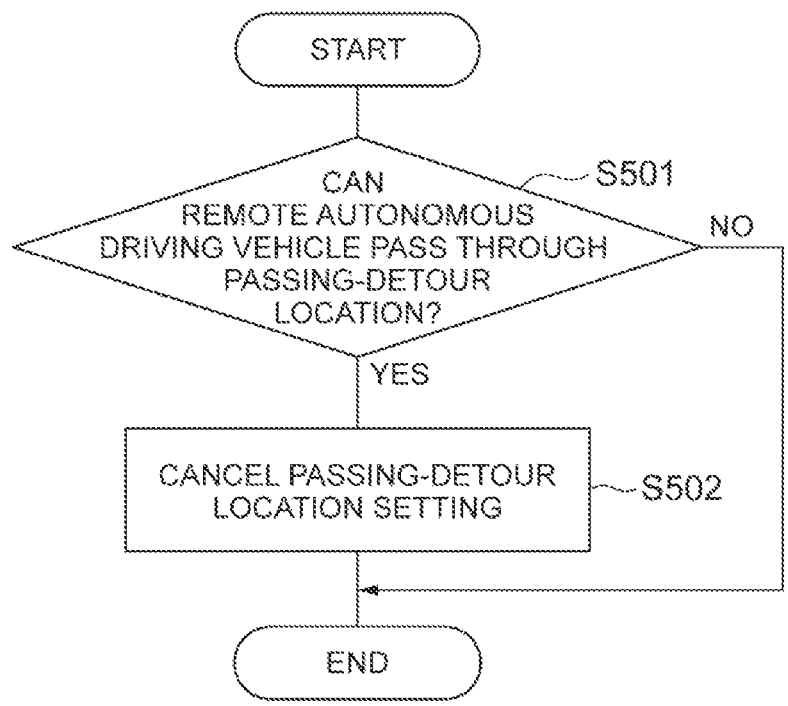
FIG. 18 is a flowchart illustrating a flow of processing for the cancellation of the passing-detour location setting performed in the remote instruction server.

Next, a flow of processing for the cancellation of the passing-detour location setting performed in the remote instruction server 10B will be described. FIG. 18 is a flowchart illustrating the flow of processing for the cancellation of the passing-detour location setting performed in the remote instruction server 10B. The processing illustrated in FIG. 18 is started when the observation apparatus 6 observes the situation of the passing-detour location and the observation data of the passing-detour location is received by the remote instruction server 10B.

When the observation data of the passing-detour location is received, the setting cancellation control unit 19B determines whether the situation is such that the remote autonomous driving vehicle 2 can pass through the passing-detour location by the autonomous driving or not based on the observation data (S501). The determination in S501 may be performed by the person such as the management staff as described above. In this case, the setting cancellation control unit 19B displays the received observation data on the display connected to the remote instruction server 10B. Then, the passing-detour location setting unit 18B may receive an input of a result of determination performed by the as management staff or the like.

If it is determined that the situation is such that the remote autonomous driving vehicle 2 can pass through the passing-detour location by the autonomous driving (YES in S501), the passing-detour location setting unit 18B cancels the setting of the passing-detour location determined to be able to pass through (S502). On the other hand, if it is determined that the situation is such that the remote autonomous driving vehicle 2 cannot pass through the passing-detour location by the autonomous driving (NO in S502), the passing-detour location setting unit 18B maintains the setting of the passing-detour location and ends the current processing.

As described above, In the vehicle remote instruction system 100B in the present modification example, the determination whether or not the vehicle can pass through the passing-detour location is performed based on the observation data of the passing-detour location observed by the observation apparatus 6. This determination may be performed by the remote instruction server 10B, or may be performed by a person such as the management staff. In this way, the vehicle remote instruction system 100B can appropriately cancel the setting of the passing-detour location based on the actual situation of the passing-detour location indicated by the observation data observed by the observation apparatus 6.

Figure 19:
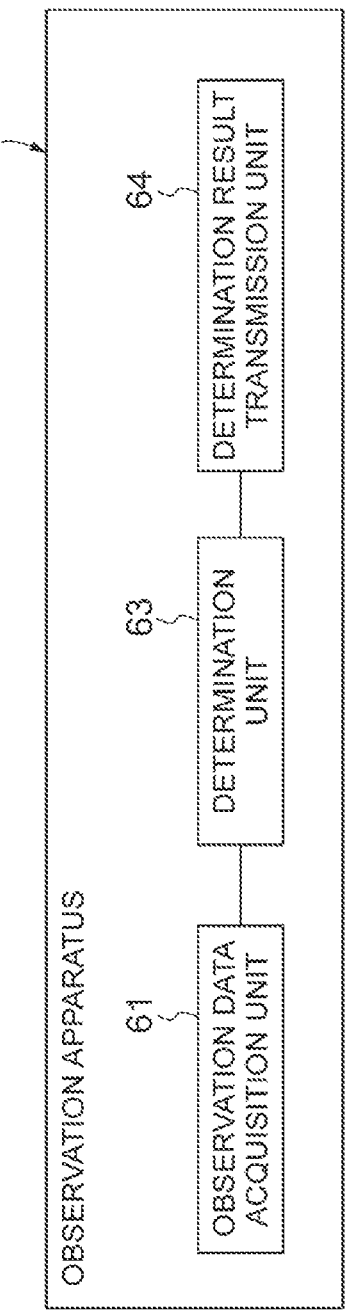
FIG. 19 is a block diagram illustrating an example of a configuration of the observation apparatus in the modification examples.

In the present modification example, the determination whether or not the situation is such that the vehicle can pass through the passing-detour location is performed by the setting cancellation control unit 19B or the like of the remote instruction server 10B, based on the observation data by the observation apparatus 6. Not limited to the above description, the observation apparatus may determine whether or not the vehicle can pass through the passing-detour location. Specifically, as illustrated in FIG. 19, the observation apparatus 6A includes an observation data acquisition unit 61, a determination unit 63, and a determination result transmission unit 64.

The determination unit 63 determines whether or not the situation is such that the remote autonomous driving vehicle 2 can pass through the passing-detour location by the autonomous driving based on the observation data acquired by the observation data acquisition unit 61. Here, for example, the determination unit 63 can recognize an object such as a stopped vehicle at the passing-detour location based on a known object recognition technology or the like, and can determine the situation. The determination result transmission unit 64 transmits the result of determination performed by the determination unit 63 to the remote instruction server 10B of the remote instruction apparatus 1B. The remote instruction server 10B of the passing-detour location setting unit 18B can cancel the setting of the passing-detour location based on the result of determination transmitted from the observation apparatus 6A. In this case, the setting cancellation control unit 19B of the remote instruction server 10B becomes unnecessary. As described above, even when the determination whether or not the vehicle can pass through the passing-detour location is performed using the observation data by the observation apparatus 6A, the setting of the passing-detour location can be appropriately canceled.

Second Embodiment

Next, a second embodiment of the vehicle remote instruction system will be described. Hereinafter, the description will be focused on differences from the vehicle remote instruction system 100 in the first embodiment. In the present embodiment, differently from the first embodiment, setting and cancellation of the passing-detour location are performed in the remote autonomous driving vehicle side. Then, the remote autonomous driving vehicle generates a target route that avoids the set passing-detour location, and autonomously travels based on the generated target route. A detailed description is omitted, but the vehicle remote instruction system in the present embodiment also issues a remote instruction to a remote autonomous driving vehicle similarly to the vehicle remote instruction system 100 in the first embodiment. In the following, the same reference numerals will be given to the same configuration elements as those of the vehicle remote instruction system 100 in the first embodiment, and detailed description thereof will not be repeated.

Figure 20:
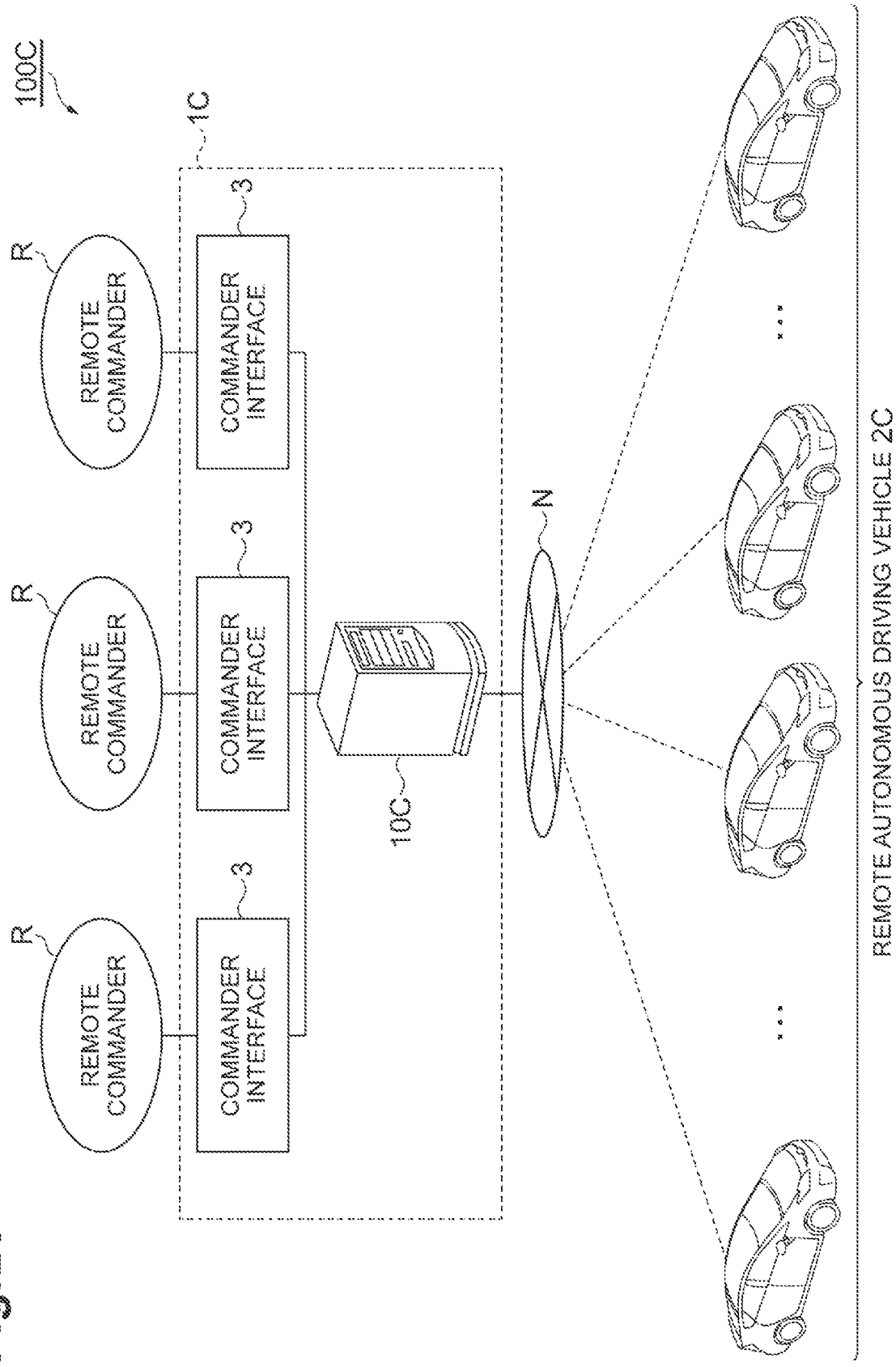
FIG. 20 is a diagram illustrating an overall image of a vehicle remote instruction system according to a second embodiment.

FIG. 20 is a diagram illustrating an overall image of a vehicle remote instruction system according to a second embodiment. A vehicle remote instruction system 100C illustrated in FIG. 20 is a system that issues a remote instruction to a remote autonomous driving vehicle 2C by a remote commander R. The vehicle remote instruction system 100C includes a remote instruction apparatus 1C to which a remote commander R inputs a remote instruction. In the vehicle remote instruction system 100C, for example, in response to a remote instruction request from the remote autonomous driving vehicle 2C, the remote commander R is requested to input the remote instruction. The remote instruction apparatus 1C transmits the remote instruction to the remote autonomous driving vehicle 2C through the network N. The remote autonomous driving vehicle 2C travels autonomously according to the remote instruction.

Configuration of Autonomous Driving Vehicle

Figure 21:
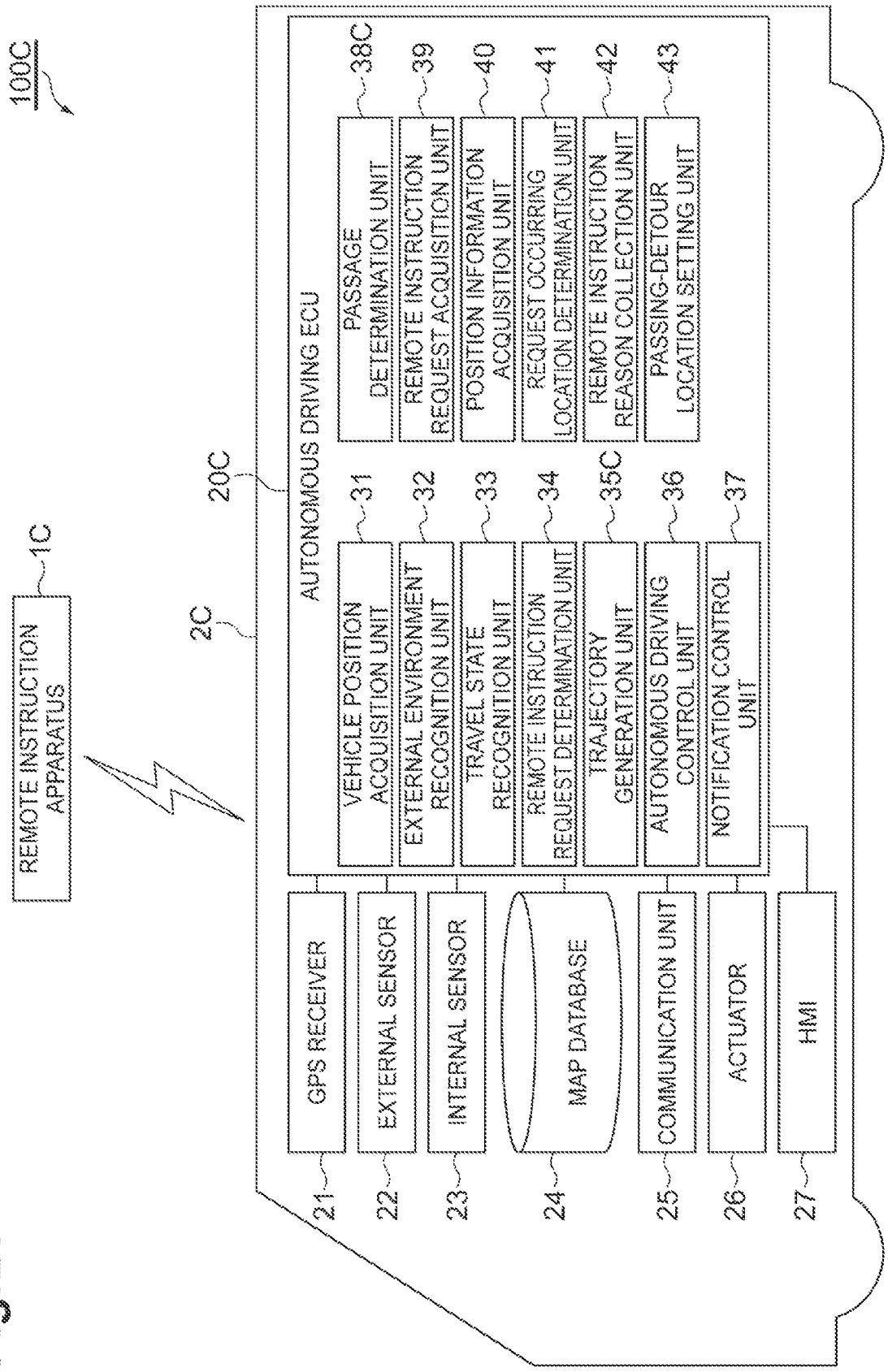
FIG. 21 is a block diagram illustrating an example of a configuration of a remote autonomous driving vehicle.

An example of a configuration of the remote autonomous driving vehicle in the present embodiment will be described. FIG. 21 is a block diagram illustrating an example of the configuration of the remote autonomous driving vehicle 2C. The remote autonomous driving vehicle 2C in the present embodiment includes an autonomous driving ECU 20C instead of the autonomous driving ECU 20 of the remote autonomous driving vehicle 2 in the first embodiment.

The autonomous driving ECU 20C includes a trajectory generation unit (a path generation unit) 35C and a passage determination unit 38C instead of the trajectory generation unit 35 and the passage determination unit 38 of the autonomous driving ECU 20 in the first embodiment. In addition, the autonomous driving ECU 20C further includes a remote instruction request acquisition unit (a remote instruction request reception unit) 39, a position information acquisition unit 40, a request occurring location determination unit 41, a remote instruction reason collection unit 42, and a passing-detour location setting unit 43.

The trajectory generation unit 35C generates a target route to the destination. The trajectory generation unit 35C uses the destination set by the remote instruction server 10C as the destination. The destination set by the remote instruction server 10C will be described later in detail. As described above, in the first embodiment, the travel management unit 11 of the remote instruction server 10 issues an instruction of the target route to the remote autonomous driving vehicle 2, but in the present embodiment, the remote autonomous driving vehicle 2C generates the target route.

The trajectory generation unit 35C generates the target route, based on, for example, the destination set by the remote instruction server 10C, the map information stored in the map database 24, and the position information on the remote autonomous driving vehicle 2C acquired by the vehicle position acquisition unit 31. As described above, the trajectory generation unit 35C sets the target route according to the service performed by the vehicle remote instruction system 100C using the remote autonomous driving vehicle 2C, similarly to the travel management unit 11 in the first embodiment.

The trajectory generation unit 35C generates the target route avoiding the passing-detour location (so as not to pass through the passing-detour location), similarly to the travel management unit 11 in the first embodiment. As described above, the trajectory generation unit 35C generates the route avoiding the passing-detour location as the target route (travel path) of the remote autonomous driving vehicle 2C based on the passing-detour location and the map information. The trajectory generation unit 35C uses the passing-detour location set by the passing-detour location setting unit 43 as the passing-detour location when generating the target route. Details of setting the passing-detour location by the passing-detour location setting unit 43 will be described later.

In addition, the trajectory generation unit 35C generates a trajectory used for autonomous driving of the remote autonomous driving vehicle 2C using the generated target route, similarly to the trajectory generation unit 35 in the first embodiment. The autonomous driving control unit 36 performs the autonomous driving of the remote autonomous driving vehicle 2C based on the trajectory generated by the trajectory generation unit 35C. If a remote instruction request to the remote instruction server 10C is made by the remote instruction request determination unit 34 during performing the autonomous driving of the remote autonomous driving vehicle 2C, the autonomous driving control unit 36 performs the remote driving based on the remote instruction from the remote commander R. The information on the location (for example, intersection, railroad crossing, and the like) that is predetermined to pass through according to the remote instruction is set in the map information stored in the map database 24.

The remote instruction request acquisition unit 39 acquires the remote instruction request transmitted by the remote instruction request determination unit 34 to the remote instruction server 10C. The acquired remote instruction request is used for counting the instruction request frequency when the request occurring location determination unit 41 determines the passing-detour location.

The position information acquisition unit 40 acquires the position information on the location where the remote instruction request determination unit 34 transmitted the remote instruction request to the remote instruction server 10C. Here, the position information acquisition unit 40 can use the position information acquired by the vehicle position acquisition unit 31 as the position information on the location from which the remote instruction request was transmitted.

Similarly to the request occurring location determination unit 16 in the first embodiment, the request occurring location determination unit 41 determines a location where the remote instruction requests are transmitted at equal to or higher frequency than the instruction request frequency set in advance based on the remote instruction request acquired by the remote instruction request acquisition unit 39 and the position information acquired by the position information acquisition unit 40. Here also, similarly to the request occurring location determination unit 16 in the first embodiment, the request occurring location determination unit 41 counts the remote instruction requests when the remote instruction request are made at the counting target location.

In addition, if the remote instruction request is made at the counting target location, the request occurring location determination unit 41 stores the location where the remote instruction request was made and the time at which the remote instruction request was made at the location in association with each other. Here, if the remote instruction requests are made a plurality of times at a certain location, the request occurring location determination unit 41 stores the time at which each of the remote instruction requests are made. The request occurring location determination unit 41 can determine the location where the remote instruction requests are transmitted at equal to or higher frequency than the instruction request frequency based on the information formed by the association in this manner.

However, when the instruction request frequency set in advance is one, the request occurring location determination unit 41 does not need to store the location where the remote instruction request is made and the time at which the remote instruction request is made at the location in association with each other. In this case, when the remote instruction request is made at the counting target location, the request occurring location determination unit 41 can determine the location from which the remote instruction request is transmitted, as the location where the remote instruction request is transmitted at equal to or higher frequency than the instruction request frequency.

Similarly to the remote instruction reason collection unit 17 in the first embodiment, the remote instruction reason collection unit 42 collects the reason why the remote instruction request determination unit 34 transmitted the remote instruction request. The remote instruction reason collection unit 42 may acquire the reason based on the input by the remote commander R. In this case, as described in the first embodiment, when issuing the remote instruction in response to the remote instruction request from the remote autonomous driving vehicle 2C, the remote commander R confirms the remote instruction required situation based on the image displayed on the display of the information output unit 3a, and inputs the reason why the remote instruction request was transmitted. The remote instruction server 10C transmits the reason input by the remote commander R to the remote autonomous driving vehicle 2C together with the remote instruction. In this way, the remote instruction reason collection unit 42 can acquire the reason why the remote instruction request was transmitted from the remote instruction server 10C.

In addition, the remote instruction reason collection unit 42 may acquire the reason from the remote instruction request determination unit 34. For example, the remote instruction request determination unit 34 determines whether or not the situation is the remote instruction required situation in which the remote instruction is required to be requested, and makes the remote instruction request. Therefore, the remote instruction reason collection unit 42 may acquire information specifying the remote instruction required situation in which the remote instruction request determination unit 34 determines that the remote instruction is required to be requested, as the reason why the remote instruction request determination unit 34 transmitted the remote instruction request.

When the remote instruction request is transmitted, if the reason why the remote instruction request was transmitted is acquired, the request occurring location determination unit 41 stores the acquired reason in association with the location where the remote instruction request was made.

Setting Passing-Detour Location

Similarly to the passing-detour location setting unit 18 in the first embodiment, the passing-detour location setting unit 43 sets the location from which the remote instruction requests are transmitted at equal to or higher frequency than the instruction request frequency as the passing-detour location for the remote autonomous driving vehicle 2C, based on the result of determination by the request occurring location determination unit 41. As described above, in the present embodiment, the remote autonomous driving vehicle 2C can set the passing-detour location based on result of travel of itself. The passing-detour location setting unit 43 sets the position of the set passing-detour location on the map in the map information stored in the map database 24.

The passing-detour location setting unit 43 may transmit the position information on the passing-detour location set based on the travel result of itself (remote autonomous driving vehicle 2C) to the remote instruction server 10C. In this case, in the vehicle remote instruction system 100C, the position information of the passing-detour location can be shared. In this way, the remote autonomous driving vehicle 2C can set the target route based on the passing-detour location set by another remote autonomous driving vehicle in addition to the passing-detour location set by itself. In addition, as will be described later, even when the setting of the passing-detour location is canceled, the passing-detour location setting unit 43 may transmit the fact the setting of the passing-detour location is canceled, to the remote instruction server 10C. In this case also, in the vehicle remote instruction system 100C, the fact that the setting of the passing-detour location is canceled can be shared.

Cancellation of Setting Passing-Detour Location

In addition, similarly to the passing-detour location setting unit 18 in the first embodiment, the passing-detour location setting unit 43 can cancel the setting of the passing-detour location. After the setting of the passing-detour location is canceled, the request occurring location determination unit 41 can restart the counting of the remote instruction requests at the location where the setting of the passing-detour location is canceled from 0 (zero).

If the remote autonomous driving vehicle 2C can autonomously pass through the passing-detour location by the autonomous driving, the passing-detour location setting unit 43 cancels the setting of the passing-detour location. Here, the travel management unit 11C of the remote instruction server 10C (refer to FIG. 22) can manage the driving of the remote autonomous driving vehicle 2C by issuing an instruction of the target route to the remote autonomous driving vehicle 2C to cause the remote autonomous driving vehicle 2C to travel by autonomous driving along the target route. Here, similarly to the travel management unit 11 in the first embodiment, for example, the travel management unit 11C issues the instruction of the target route passing through the passing-detour location to the remote autonomous driving vehicle 2C in a state of not performing the services such as the occupant transportation, and causes the remote autonomous driving vehicle 2C to travel so as to pass through the passing-detour location. As described above, in the present embodiment, when canceling the setting of the passing-detour location, the remote instruction server 10C issues the instruction of the target route passing through the passing-detour location to the remote autonomous driving vehicle 2C.

The remote autonomous driving vehicle 2C travels along the target route by the autonomous driving based on the instruction from the travel management unit 11C. Here, the trajectory generation unit 35C of the remote autonomous driving vehicle 2C generates a trajectory based on the instructed target route. That is, here, the trajectory generation unit 35C generates the trajectory passing through the passing-detour location. The passage determination unit 38C of the remote autonomous driving vehicle 2C determines whether or not the vehicle can autonomously pass through the passing-detour location by the autonomous driving without making the remote instruction request. If it is determined to be possible to pass through, the passage determination unit 38C determines that the vehicle can pass through the passing-detour location by the autonomous driving.

If it is determined by the passage determination unit 38C that the remote autonomous driving vehicle 2C can pass through the passing-detour location by the autonomous driving, the passing-detour location setting unit 43 cancels the setting of the passing-detour location. On the other hand, when traveling along the target route instructed by the travel management unit 11C, it is assumed that the remote autonomous driving vehicle 2C cannot pass through the passing-detour location by the autonomous driving, and passes through the passing-detour location by the remote driving by making the remote instruction request. In this case, the passage determination unit 38C determines that the vehicle cannot pass through the passing-detour location by the autonomous driving. Then, the passing-detour location setting unit 43 does not cancel the setting of the passing-detour location.

The passing-detour location setting unit 43 can also cancel the setting of the passing-detour location based on the instruction from the remote instruction server 10C. In this way, the remote autonomous driving vehicle 2C can cancel the setting of the passing-detour location without actually trying to determine whether or not the autonomous driving can pass through the passing-detour location.

The notification control unit 37 can display the target route generated by the trajectory generation unit 35C on the display of the HMI 27. In addition, the notification control unit 37 notifies the occupant of the remote autonomous driving vehicle 2C of the reason why the remote instruction request is transmitted at the passing-detour location together with the target route avoiding the passing-detour location generated by the trajectory generation unit 35C, using the HMI 27. In this way, the occupant of the remote autonomous driving vehicle 2C can recognize the reason of traveling on the route avoiding the passing-detour location by checking the display.

Configuration of Remote Instruction Apparatus

Figure 22:
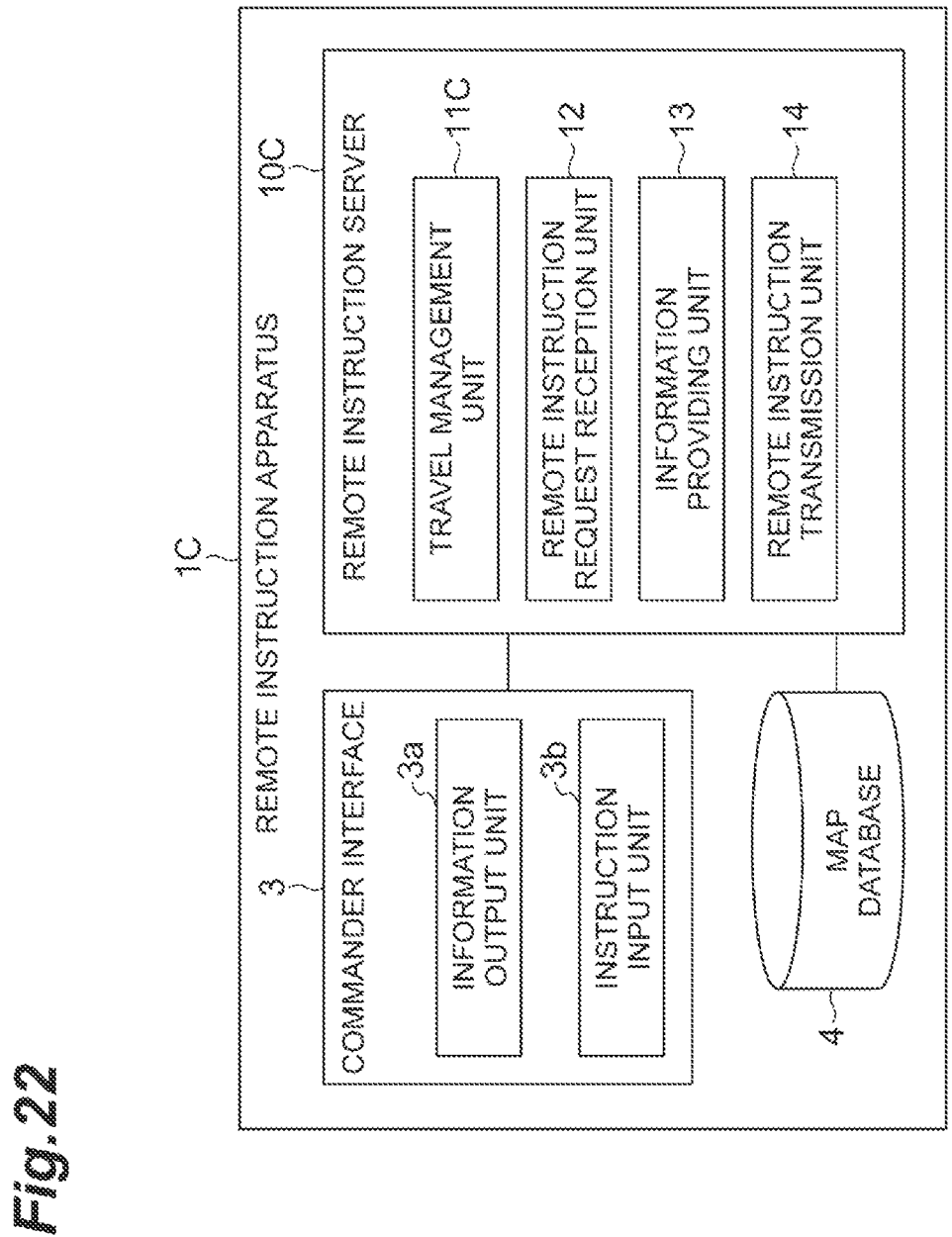
FIG. 22 is a block diagram illustrating an example of a configuration of the remote instruction apparatus.

Hereinafter, a configuration of the remote instruction apparatus 1C according to the present embodiment will be described with reference to the drawings. As illustrated in FIG. 22, the remote instruction apparatus 1C according to the present embodiment includes a remote instruction server 10C instead of the remote instruction server 10 of the remote instruction apparatus 1 in the first embodiment. Differently from the remote instruction apparatus 1 in the first embodiment, the remote instruction apparatus 1C does not perform processing such as setting and canceling the passing-detour location. Specifically, the remote instruction server 10C includes a travel management unit 11C, a remote instruction request reception unit 12, an information providing unit 13, and a remote instruction transmission unit 14.

When providing a service using the remote autonomous driving vehicle 2C performed by the vehicle remote instruction system 100C, the travel management unit 11C manages the driving of the remote autonomous driving vehicle 2C by issuing an instruction of the destination to the remote autonomous driving vehicle 2C to cause the vehicle to travel toward the destination. The travel management unit 11C issues the instruction of the destination based on, for example, the request to start traveling of the remote autonomous driving vehicle 2C. The destination and the request to start traveling of the remote autonomous driving vehicle 2C are appropriately determined according to, for example, the service using the remote autonomous driving vehicle 2C performed by the vehicle remote instruction system 100C.

In addition, the travel management unit 11C issues the instruction of a target route passing through the passing-detour location to the remote autonomous driving vehicle 2C which is in a state in which services such as occupant transportation are not provided, and causes the remote autonomous driving vehicle 2C to travel so as to pass through the passing-detour location. In this way, as described above, the remote autonomous driving vehicle 2C can cancel the setting of the passing-detour location based on whether or not the vehicle can pass through the passing-detour location by the autonomous driving. If the position information on the passing-detour location set by the remote autonomous driving vehicle 2C is received from the remote autonomous driving vehicle 2C, the remote instruction server 10C sets the position information on the passing-detour location in the map information in the map database 4. The travel management unit 11C can generate the target route passing through the passing-detour location based on the position information on the passing-detour location set in the map information in the map database 4, and can cause the remote autonomous driving vehicle 2C to travel so as to pass through the passing-detour location.

As described above, in the vehicle remote instruction system 100C, the remote autonomous driving vehicle 2C includes a passing-detour location setting unit 43 that performs setting and canceling of the passing-detour location. Even in this case, the vehicle remote instruction system 100C can set the location where the frequency of remote instruction request is equal to or higher than the instruction request frequency, as the passing-detour location for the remote autonomous driving vehicle 2C. In this way, the vehicle remote instruction system 100C can suppress the remote autonomous driving vehicle 2C from passing through the location where the remote instruction request occurs by setting the passing-detour location. As a result, the vehicle remote instruction system 100C can reduce the load on the remote commander R. As described above, the vehicle remote instruction system 100C can achieve operational effects similar to that of the vehicle remote instruction system 100 in the first embodiment.

The embodiments of the present disclosure are described above, but the present disclosure is not limited to the above-described embodiments. For example, in the vehicle remote instruction system 100 in the first embodiment, the travel management unit 11 of the remote instruction server 10 generates the target route. Not limited thereto, the trajectory generation unit 35 of the remote autonomous driving vehicle 2 may generate the target route. In this case, similarly to the travel management unit 11, the trajectory generation unit 35 generates the target route avoiding the passing-detour location, and generates the trajectory based on the generated target route. When the trajectory generation unit 35 generates the target route, the remote autonomous driving vehicle 2 acquires the position information on the passing-detour location from the remote instruction server 10 and sets the acquired position information in the map information in the map database 24. The trajectory generation unit 35 can generate the target route based on the position information on the passing-detour location stored in the map database 24. In addition, the trajectory generation unit 35 can acquire the position information on the destination from the remote instruction server 10C and can generate the target route.

In the vehicle remote instruction system 100C in the second embodiment, the trajectory generation unit 35C sets the target route based on the destination set by the remote instruction server 10C. Not limited thereto, the trajectory generation unit 35C may acquire the target route to the destination, from the travel management unit 11C of the remote instruction server 10C. Then, if the acquired target route is a route passing through the passing-detour location based on the position information on the passing-detour location stored in the map database 24, the trajectory generation unit 35C may modify the target route to avoid the passing-detour location.

The first modification example and the second modification example of cancellation of the passing-detour location setting can be applied to the vehicle remote instruction system 100C in the second embodiment. Furthermore, various methods of cancellation setting the passing-detour location described above can be appropriately combined, and the various methods may be performed in parallel. The method of cancellation of the passing-detour location setting is not limited to the method described above. It is not essential that the cancellation of the passing-detour location setting be performed using the method described above.

In the first embodiment, the remote instruction apparatus 1 may be mounted on the vehicle. In this case, the remote commander R is also in the vehicle. The remote instruction server 10 may be a cloud server configured with ECUs of a plurality of vehicles. The same applies to other modification examples and the embodiments.

At least a part of the embodiments and various modification examples described above may be optionally combined.

What is claimed is:

1. A system comprising:
a remote autonomous driving vehicle; and
a remote instruction apparatus comprising a processor programmed to:
receive a remote instruction request from the remote autonomous driving vehicle, the remote instruction request requiring the processor to provide remote instructions to the remote autonomous driving vehicle;
acquire position information on a location where the remote autonomous driving vehicle transmitted the remote instruction request;
determine a location where the remote instruction request is transmitted at equal to or higher frequency than an instruction request frequency set in advance, based on the received remote instruction request and the acquired position information;
set the location where the remote instruction request is transmitted at equal to or higher frequency than the instruction request frequency set in advance, as a passing-detour location for the remote autonomous driving vehicle;
generate a travel path avoiding the passing-detour location;
transmit the travel path to the remote autonomous driving vehicle;
transmit setting cancellation determination information on the passing-detour location to a user terminal located at the passing-detour location remote from a location of the remote instruction apparatus, the setting cancellation determination information including a reason why the remote autonomous driving vehicle cannot pass through the passing-detour location without making the remote instruction request;
receive, from the user terminal, a notification indicating that the remote autonomous driving vehicle can pass through the passing-detour location without making the remote instruction request, the user terminal receiving the notification from a terminal user to whom the reason was presented via the user terminal; and
cancel the setting of the passing-detour location in response to receiving the notification,
wherein the remote autonomous driving vehicle drives based on the travel path.

2. The system according to claim 1, wherein the processor is further configured to:
collect a reason why the remote instruction request is transmitted; and
notify an occupant of the remote autonomous driving vehicle of the reason why the remote instruction request is transmitted from the location set as the passing-detour location, based on the collected reason.

* * * * *